(12) United States Patent
Huang et al.

(10) Patent No.: US 11,974,162 B2
(45) Date of Patent: Apr. 30, 2024

(54) COMMUNICATION METHOD AND DEVICE

(71) Applicant: Huawei Technologies Co., Ltd., Shenzhen (CN)

(72) Inventors: Qufang Huang, Shenzhen (CN); Qiang Fan, Hefei (CN); Chong Lou, Shanghai (CN); Bin Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 495 days.

(21) Appl. No.: 17/214,801

(22) Filed: Mar. 27, 2021

(65) Prior Publication Data

US 2021/0219171 A1    Jul. 15, 2021

Related U.S. Application Data

(63) Continuation of application No. PCT/CN2019/108126, filed on Sep. 26, 2019.

(30) Foreign Application Priority Data

Sep. 28, 2018  (CN) .......................... 201811143546.7

(51) Int. Cl.
*H04W 80/02*    (2009.01)
*H04L 1/00*     (2006.01)
(Continued)

(52) U.S. Cl.
CPC ........... *H04W 28/04* (2013.01); *H04L 1/0061* (2013.01); *H04L 5/0098* (2013.01); *H04W 28/06* (2013.01)

(58) Field of Classification Search
None
See application file for complete search history.

(56) References Cited

U.S. PATENT DOCUMENTS 11,483,891 B2 * 10/2022 Ingale ............... H04W 36/0069
11,601,227 B2 *  3/2023 Decarreau ................. H04L 1/08
(Continued)

FOREIGN PATENT DOCUMENTS

CN    107438976 A    12/2017
CN    108282823 A     7/2018
(Continued)

OTHER PUBLICATIONS

"Resource efficient data duplication," 3GPP TSG-RAN WG2 #103bis, Chengdu, China, Tdoc R2-1814814, Total 2 pages, 3rd Generation Partnership Project, Valbonne, France (Oct. 8-12, 2018).
(Continued)

*Primary Examiner* — Ajit Patel
(74) *Attorney, Agent, or Firm* — Leydig, Voit & Mayer, Ltd.

(57) ABSTRACT

Embodiments of this application provide a communication method and a related device. The method which is implemented by a terminal device includes: receiving a configuration message, where the configuration message indicates the terminal device to establish at least three radio link control (RLC) entities on a first bearer; establishing the at least three RLC entities on the first bearer based on the configuration message; and performing data transmission through at least one RLC entity on the first bearer. According to the application, data transmission reliability is improved and a data transmission latency is reduced.

20 Claims, 18 Drawing Sheets

(51) Int. Cl.
  *H04L 5/00* (2006.01)
  *H04W 28/04* (2009.01)
  *H04W 28/06* (2009.01)
  *H04W 76/15* (2018.01)

(56) References Cited

U.S. PATENT DOCUMENTS

| | | | |
|---|---|---|---|
| 2018/0324642 A1* | 11/2018 | Yu | H04L 5/0053 |
| 2019/0053325 A1* | 2/2019 | Yu | H04W 76/15 |
| 2019/0058550 A1* | 2/2019 | Kim | H04L 1/1825 |
| 2019/0104562 A1* | 4/2019 | Tsai | H04L 1/1864 |
| 2019/0387535 A1* | 12/2019 | Kim | H04W 72/1268 |
| 2020/0037151 A1* | 1/2020 | Du | H04W 8/30 |

FOREIGN PATENT DOCUMENTS

| | | |
|---|---|---|
| CN | 108282824 A | 7/2018 |
| CN | 108337633 A | 7/2018 |
| EP | 3510822 A1 | 7/2019 |
| IN | 108401530 A | 8/2018 |
| WO | 2013155709 A1 | 10/2013 |
| WO | 2018164499 A1 | 9/2018 |
| WO | 2019061182 A1 | 4/2019 |
| WO | 2020060234 A1 | 3/2020 |
| WO | WO-2020060234 A1 * | 3/2020 ........... H04L 1/1614 |
| WO | 2020147053 A1 | 7/2020 |
| WO | WO-2020147053 A1 * | 7/2020 ........... H04L 1/1614 |

OTHER PUBLICATIONS

"Discussion on Data Duplication for PC5 CA," 3GPP TSG-RAN WG2 Meeting #99bis, Prague, Czech, R2-1711013, Total 5 pages, 3rd Generation Partnership Project, Valbonne, France (Oct. 9-13, 2017).

"Consideration on Data Duplication Design for PC5 CA," 3GPP TSG-RAN WG2 Meeting #100, Reno, USA, R2-1713071, Total 5 pages, 3rd Generation Partnership Project, Valbonne, France (Nov. 27-Dec. 1, 2017).

"PDCP status report and structure for duplication," 3GPP TSG-RAN WG2 Meeting #NR AH2, R2-1706380 Update of R2-1704249-4246, Qingdao, China, pp. 1-3, 3rd Generation Partnership Project, Valbonne, France (Jun. 27-29, 2017).

"Impact of duplication on RLC," 3GPP TSG-RAN2 Meeting AH#1, R2-1800068, Vancouver, Canada, pp. 1-3, 3rd Generation Partnership Project, Valbonne, France (Jan. 22-26, 2018).

* cited by examiner

| Bit | | | | | | | |
|---|---|---|---|---|---|---|---|
| 7 | 6 | 5 | 4 | 3 | 2 | 1 | 0 |
| Protocol data unit (PDU) type (=2) | | | | | | | |
| | | | | | | Uplink duplicate transmission function of an RLC entity 3 needs to be activated | Uplink duplicate transmission function of an RLC entity 4 needs to be activated |

First indication information (points to bits 3-0 row)

FIG. 20

COMMUNICATION METHOD AND DEVICE

CROSS-REFERENCE TO RELATED APPLICATIONS

This application is a continuation of International Application No. PCT/CN2019/108126, filed on Sep. 26, 2019, which claims priority to Chinese Patent Application No. 201811143546.7, filed on Sep. 28, 2018. The disclosures of the aforementioned applications are hereby incorporated by reference in their entireties.

TECHNICAL FIELD

Embodiments of this application relate to the field of communications technologies, and in particular, to a communication method and a device.

BACKGROUND

In an existing communications system, after receiving a data packet from a gateway, an access network searches for a proper radio transmission resource, to transmit the data packet over a radio interface after processing the data packet. An error may occur during transmission of the data packet due to attenuation of a radio signal and interference of other noise. In this case, a retransmission mechanism is introduced to a wireless network. If finding that an error exists in a received data packet, a receiver notifies a sender to retransmit the data packet. After receiving a retransmitted data packet, the receiver combines the retransmitted data packet with the initially transmitted data packet. If finding that the error still exists in data, the receiver notifies again the sender to retransmit the data packet.

Although this retransmission mode improves a correctness rate of data transmission, a data transmission latency is also caused. Therefore, there is a latency problem when this mode is used for a "low latency+high reliability" service. As a result, how to improve data transmission reliability and reduce the data transmission latency is an urgent problem to be resolved currently.

SUMMARY

Embodiments of this application provide a communication method and a related device, to help improve data transmission reliability and reduce a data transmission latency.

According to a first aspect, an embodiment of this application provides a communication method. The method is used in a terminal device, and includes: receiving a configuration message, where the configuration message is used to indicate the terminal device to establish at least three radio link control RLC entities on a first bearer; establishing the at least three RLC entities on the first bearer based on the configuration message; and performing data transmission through at least one RLC entity on the first bearer. Based on the method described in the first aspect, the terminal device can establish the at least three RLC entities on the first bearer. Therefore, the terminal device may send at least three same data packets on the first bearer, or may select a part of RLC entities on the first bearer for data transmission. Therefore, the method described in the first aspect helps improve data transmission reliability and reduce a data transmission latency.

In an optional implementation, when selecting the part of RLC entities from the first bearer for data transmission, the terminal device may specifically select, from the first bearer based on radio air interface quality of an RLC entity whose duplicate transmission function is activated and/or a quantity of bits of an unsent duplicated data packet in the RLC entity, an RLC entity used for data transmission. Based on this implementation, the terminal device may select, from the first bearer, an RLC entity with good radio air interface quality that buffers a duplicated data packet with a small quantity of bits, to perform data transmission. Selecting an RLC entity with good air interface quality for data transmission helps improve the data transmission reliability, and selecting an RLC entity that buffers a duplicated data packet with a small quantity of bits helps reduce the data transmission latency.

In an optional implementation, a specific implementation of the performing data transmission through at least one RLC entity on the first bearer is: generating a first data packet; and performing duplicate transmission on the first data packet through at least two RLC entities on the first bearer. Based on this implementation, the terminal device may send at least three same data packets on the first bearer, or may perform duplicate transmission through the part of RLC entities with good air interface quality on the first bearer that buffer the duplicated data packet with the small quantity of bits. Therefore, this implementation helps improve the data transmission reliability and reduce the data transmission latency.

In an optional implementation, the terminal device may further indicate, to an RLC entity in the at least two RLC entities that perform duplicate transmission, that the first data packet is a duplicated data packet. Specifically, the terminal device may indicate, to all the at least two RLC entities, that the first data packet is a duplicated data packet. The terminal device may indicate, to a part of the at least two RLC entities, that the first data packet is a duplicated data packet. The terminal device may indicate, to a preset quantity of RLC entities in the at least two RLC entities, that the first data packet is a duplicated data packet. The preset quantity may be preconfigured by an access network device. Based on this implementation, the RLC entity can distinguish which data packets are duplicated data packets and which data packets are non-duplicated data packets, so that a duplicated data packet can be discarded when the duplicated data packet is not sent in time.

In an optional implementation, the terminal device may further receive a first instruction that is sent by the access network device and that is used to activate or deactivate duplicate transmission functions of the RLC entities on the first bearer. After receiving the first instruction, the terminal device may notify the RLC entities on the first bearer that the first instruction is received. Based on this implementation, the RLC entity can distinguish which data packets are duplicated data packets and which data packets are non-duplicated data packets, so that a duplicated data packet can be discarded when the duplicated data packet is not sent in time.

In an optional implementation, when detecting that a preset quantity of RLC entities on the first bearer have sent the first data packet, the terminal device may further notify an RLC entity that has not sent the first data packet to delete the first data packet. Optionally, the terminal device may notify, through an upper-layer entity of the RLC entity, the RLC entity that has not sent the first data packet to delete the first data packet. The upper-layer entity may be a PDCP entity or another upper-layer entity of the RLC entity. Alternatively, after sending the first data packet, an RLC entity on the first bearer may notify another RLC entity on the first bearer that the first data packet has been sent. An RLC entity may count, after receiving a notification that is sent by another RLC entity and that is used to notify that the first data packet has been sent, a quantity of RLC entities that have sent the first data packet. If the quantity reaches the preset quantity, the RLC entity deletes and does not send the first data packet. This implementation helps reduce the data transmission latency.

In an optional implementation, a transport block in which the first data packet is located does not include a data packet other than the first data packet. Because the transport block in which the first data packet is located does not include the data packet other than the first data packet, after receiving transport blocks in which a plurality of first data packets are located, the access network device can combine the received plurality of first data packets. Therefore, this implementation helps the access network device combine the received plurality of first data packets.

In an optional implementation, the terminal device may further receive a second data packet, where a transport block in which the second data packet is located does not include a data packet other than the second data packet. The terminal device combines the second data packet with a duplicated data packet that is of the second data packet and that is stored in the terminal device. Optionally, the terminal device specifically combines, through a MAC entity, the second data packet received this time with the duplicated data packet that is of the second data packet and that is stored in the terminal device. Combining the second data packet received this time with the duplicated data packet that is of the second data packet and that is stored in the terminal device helps improve a combining gain.

Optionally, the terminal device may further receive a target indication, where the target indication is used to indicate a time-frequency resource of a second data packet sent last time and an identifier of a cell in which the second data packet is sent last time, or the target indication is used to indicate a hybrid automatic repeat request (HARQ) process identifier of a second data packet sent last time and an identifier of a cell in which the second data packet is sent last time, or the target indication is used to indicate a HARQ process identifier and a subband identifier that are of a second data packet sent last time. In this way, the terminal device can find, based on the target indication, the duplicated data packet that is of the second data packet and that is stored in the terminal device, to combine the second data packet stored in the terminal device with the second data packet received this time.

In an optional implementation, the configuration message includes identifiers of the to-be-configured RLC entities or logical channel identifiers. The RLC entities may correspond to different logical channel identifiers. Therefore, the at least three RLC entities on the first bearer may be configured by using the logical channel identifiers.

In an optional implementation, the terminal device may further receive the first instruction from the access network device, where the first instruction includes a bearer status field, the bearer status field includes at least one bit, the bearer status field corresponds to a bearer configured with a duplicate transmission function, each bit in the bearer status field corresponds to one RLC entity on the bearer, and the bit is used to indicate to activate or deactivate a duplicate transmission function of the corresponding RLC entity. Based on this implementation, the duplicate transmission function of the RLC entity on the bearer configured with the duplicate transmission function can be activated or deactivated.

Optionally, the bits in the bearer status field are sorted in ascending order of logical channel identifiers corresponding to the RLC entities, or are sorted in descending order of values of logical channel identifiers corresponding to the RLC entities.

Optionally, the RLC entities included on the bearer corresponding to the bearer status field are classified into a primary RLC entity and a secondary RLC entity. The first instruction is used to activate or deactivate a duplicate transmission function of the secondary RLC entity, that is, each bit in the bearer status field corresponds to one secondary RLC entity on the bearer.

Optionally, the first instruction further includes a bearer indication field, the bearer indication field includes at least one bit, and each bit corresponds to one bearer configured with a duplicate transmission function, and is used to indicate whether the first instruction includes a bearer status field corresponding to the bearer.

Optionally, the bits in the bearer indication field are sorted in ascending order of values of bearer identifiers, or are sorted in descending order of values of bearer identifiers.

In an optional implementation, the terminal device may further send a first indication to the access network device, where the first indication is used to indicate a quantity of bits of an unsent duplicated data packet in an RLC entity that is of the terminal device and whose duplicate transmission function is activated. In this way, after receiving the first indication, the access network device may allocate a communication resource to the terminal device. For example, if the quantity of bits of the unsent duplicated data packet in the RLC entity that is of the terminal device and whose duplicate transmission function is activated is relatively large, a resource in a cell corresponding to the RLC entity is preferentially allocated to the terminal device. Therefore, this implementation helps allocate the resource to the terminal device in time.

In an optional implementation, a specific implementation in which the terminal device performs data transmission through the at least one RLC entity on the first bearer may alternatively be: performing data transmission with a first access network device through the at least one RLC entity on the first bearer. The terminal device may further receive a second instruction sent by a master access network device, where the second instruction is used to instruct the terminal device to perform data transmission with a second access network device; reset the RLC entities on the first bearer; and perform data transmission with the second access network device through the reset RLC entities. Based on this implementation, the terminal device may be handed over to an access network device among a plurality of access network devices for data transmission.

In an optional implementation, the RLC entities of the terminal device on the first bearer are grouped into a primary RLC entity group and a secondary RLC entity group. RLC entities in the two RLC entity groups are different, and activation states of duplicate transmission functions of RLC entities in a same RLC entity group are the same. Correspondingly, the terminal device may receive the first instruction, where the first instruction is used to activate or deactivate duplicate transmission functions in the RLC entity groups on the first bearer, that is, the duplicate transmission functions are activated or deactivated in a unit of an RLC entity group. The RLC entities of the terminal device on the first bearer are grouped into the primary RLC entity group and the secondary RLC entity group, so that a format of a MAC CE in an existing protocol can remain unchanged.

Optionally, the primary RLC entity group and the secondary RLC entity group may be configured by a network side device. For example, the network side device may indicate, by using RRC signaling, which RLC entity group is the primary RLC entity group and which RLC entity group is the secondary RLC entity group. Alternatively, the terminal device may determine, according to a preset rule, which RLC entity group is the primary RLC entity group and which RLC entity group is the secondary RLC entity group.

In an optional implementation, each RLC entity on the first bearer corresponds to one subband or one subband set, and at least two RLC entities of the terminal device on the first bearer correspond to different subbands or different subband sets. Each RLC entity of the terminal device on the first bearer performs data transmission in the corresponding subband, or performs data transmission in a subband in the corresponding subband set. One cell may be divided into several bandwidth parts (BWP), and one bandwidth part is one subband. The subband set is a set including a plurality of subbands. Optionally, the network side device may configure the subbands or the subband sets corresponding to the RLC entities of the terminal device on the first bearer. Data transmission is performed in different subbands, to help improve a diversity gain of the data transmission.

In an optional implementation, a first RLC entity and a second RLC entity of the terminal device on the first bearer correspond to different subbands, the first RLC entity corresponds to a first subband, the second RLC entity corresponds to a second subband, and a difference between a subcarrier spacing of the first subband and a subcarrier spacing of the second subband is less than a first preset value, and/or a frequency gap between the first subband and the second subband is greater than a second preset value. In other words, the difference between the subcarrier spacings of the two subbands is made relatively small, and/or the frequency gap between the two subbands is made large enough. A relatively small difference between the subcarrier spacings of the two subbands can cause a small difference in duplicate transmission. A large enough frequency gap between the two subbands can improve reliability of the duplicate transmission.

In an optional implementation, at least two RLC entities on the first bearer that are included in the terminal device perform duplicate transmission on transmission resources of different cell sets. Performing duplicate transmission on transmission resources of different cell sets helps improve the diversity gain of the data transmission.

According to a second aspect, an embodiment of this application provides a communication method. The method is used in an access network device, and includes: establishing at least one RLC entity on a first bearer, where the first bearer includes at least three RLC entities of a terminal device, and includes at least three RLC entities of one or more access network devices in total; and performing data transmission through at least one RLC entity on the first bearer. Based on the method described in the second aspect, the access network device can establish the at least one RLC entity on the first bearer. The first bearer includes the at least three RLC entities of the terminal device, and includes the at least three RLC entities of the one or more access network devices in total. Therefore, when the access network device performs data transmission with the terminal device, an access network device side may send at least three same data packets on the first bearer, or may select a part of RLC entities on the first bearer for data transmission. Therefore, the method described in the second aspect helps improve data transmission reliability and reduce a data transmission latency.

In an optional implementation, when selecting the part of RLC entities from the first bearer for data transmission, the access network device may specifically determine, in the first bearer based on radio air interface quality of an RLC entity whose duplicate transmission function is activated and/or a quantity of bits of an unsent duplicated data packet in the RLC entity, an RLC entity used for data transmission. Based on this implementation, a master access network device may select, from the first bearer, an RLC entity with good radio air interface quality that buffers a duplicated data packet with a small quantity of bits, to perform data transmission. Selecting an RLC entity with good air interface quality for data transmission helps improve the data transmission reliability, and selecting an RLC entity that buffers a duplicated data packet with a small quantity of bits helps reduce the data transmission latency.

In an optional implementation, a specific implementation in which the access network device performs data transmission through the at least one RLC entity on the first bearer is: receiving a second data packet; and performing duplicate transmission on the second data packet through the at least one RLC entity on the first bearer. Based on this implementation, the access network device side may send at least three same data packets on the first bearer, or may perform duplicate transmission through the part of RLC entities with good air interface quality on the first bearer that buffer the duplicated data packet with the small quantity of bits. Therefore, this implementation helps improve the data transmission reliability and reduce the data transmission latency.

In an optional implementation, the access network device may further indicate, to an RLC entity in the at least one RLC entity that performs duplicate transmission, that the second data packet is a duplicated data packet. Specifically, the access network device may indicate, to all the at least one RLC entity, that the second data packet is a duplicated data packet. The access network device may indicate, to a part of the at least one RLC entity, that the second data packet is a duplicated data packet. The access network device may indicate, to a preset quantity of RLC entities in the at least one RLC entity, that the second data packet is a duplicated data packet. Based on this implementation, the RLC entity can distinguish which data packets are duplicated data packets and which data packets are non-duplicated data packets, so that a duplicated data packet can be discarded when the duplicated data packet is not sent in time.

In an optional implementation, when detecting that a preset quantity of RLC entities on the first bearer have sent the second data packet, the access network device may notify an RLC entity that has not sent the second data packet to delete the second data packet. This implementation helps reduce the data transmission latency.

In an optional implementation, a transport block in which the second data packet is located does not include a data packet other than the second data packet. This implementation helps the terminal device combine a plurality of received second data packets.

Optionally, the access network device may further send a target indication, where the target indication is used to indicate a time-frequency resource of a second data packet sent last time and an identifier of a cell in which the second data packet is sent last time, or the target indication is used to indicate a hybrid automatic repeat request (HARQ) process identifier of a second data packet sent last time and an identifier of a cell in which the second data packet is sent last time, or the target indication is used to indicate a HARQ process identifier and a subband identifier that are of a second data packet sent last time. In this way, the terminal device can find, based on the target indication, a duplicated data packet that is of the second data packet and that is stored in the terminal device, to combine the second data packet stored in the terminal device with a second data packet received this time.

In an optional implementation, the access network device may further receive a first data packet, where a transport block in which the first data packet is located does not include a data packet other than the first data packet. The access network device combines the first data packet with a duplicated data packet that is of the first data packet and that is stored in the access network device. Combining the first data packet received this time with the duplicated data packet that is of the first data packet and that is stored in the access network device helps improve a combining gain.

In an optional implementation, the access network device may further send a configuration message to the terminal device, where the configuration message is used to indicate the terminal device to establish the at least three RLC entities on the first bearer, and includes identifiers of the to-be-configured RLC entities or logical channel identifiers. Based on this implementation, the at least three RLC entities may be configured on the first bearer for the terminal device.

In an optional implementation, the access network device may further send a first instruction to the terminal device, where the first instruction includes a bearer status field, the bearer status field includes at least one bit, the bearer status field corresponds to a bearer configured with a duplicate transmission function, each bit in the bearer status field corresponds to one RLC entity on the bearer, and the bit is used to indicate to activate or deactivate a duplicate transmission function of the corresponding RLC entity. Based on this implementation, the duplicate transmission function of the RLC entity on the bearer configured with the duplicate transmission function can be activated or deactivated.

Optionally, the bits in the bearer status field are sorted in ascending order of logical channel identifiers corresponding to the RLC entities, or are sorted in descending order of values of logical channel identifiers corresponding to the RLC entities.

Optionally, the RLC entities included on the bearer corresponding to the bearer status field are classified into a primary RLC entity and a secondary RLC entity. The first instruction is used to activate or deactivate a duplicate transmission function of the secondary RLC entity, that is, each bit in the bearer status field corresponds to one secondary RLC entity on the bearer.

Optionally, the first instruction further includes a bearer indication field, the bearer indication field includes at least one bit, and each bit corresponds to one bearer configured with a duplicate transmission function, and is used to indicate whether the first instruction includes a bearer status field corresponding to the bearer.

Optionally, the bits in the bearer indication field are sorted in ascending order of values of bearer identifiers, or are sorted in descending order of values of bearer identifiers.

In an optional implementation, the access network device may further receive a first indication sent by the terminal device, where the first indication is used to indicate a quantity of bits of an unsent duplicated data packet in an RLC entity that is of the terminal device and whose duplicate transmission function is activated. After receiving the first indication, the access network device may allocate a communication resource to the terminal device. For example, if the quantity of bits of the unsent duplicated data packet in the RLC entity that is of the terminal device and whose duplicate transmission function is activated is relatively large, a resource in a cell corresponding to the RLC entity is preferentially allocated to the terminal device. Therefore, this implementation helps allocate the resource to the terminal device in time.

In an optional implementation, the access network device is a master access network device, and may further receive a second indication sent by a secondary access network device, where the second indication is used to indicate a quantity of bits of an unsent duplicated data packet in an RLC entity that is of the secondary access network device and whose duplicate transmission function is activated. Based on this implementation, the master access network device may select, from the RLC entity that is of the secondary access network device and whose duplicate transmission function is activated, an RLC entity whose unsent duplicated data packet has a relatively small quantity of bits, to perform duplicate transmission. This helps reduce the data transmission latency.

In an optional implementation, the access network device is a master access network device. The access network device may further send a second instruction to the terminal device, where the second instruction is used to instruct the terminal device to perform data transmission with a second access network device; and indicate the second access network device to perform data transmission with the terminal device through an RLC entity on the first bearer. Based on this implementation, the terminal device may be handed over to an access network device among a plurality of access network devices for data transmission.

In an optional implementation, the RLC entities of the one or more access network devices on the first bearer are grouped into a primary RLC entity group and a secondary RLC entity group. RLC entities in the two RLC entity groups are different, and activation states of duplicate transmission functions of RLC entities in a same RLC entity group are the same.

In an optional implementation, each RLC entity on the first bearer corresponds to one subband or one subband set, and at least two RLC entities of the one or more access network devices on the first bearer correspond to different subbands or different subband sets. Performing duplicate transmission in different subbands helps improve a diversity gain of the data transmission.

Optionally, a first RLC entity and a second RLC entity on the access network device side and on the first bearer correspond to different subbands, the first RLC entity corresponds to a first subband, the second RLC entity corresponds to a second subband, and a difference between a subcarrier spacing of the first subband and a subcarrier spacing of the second subband is less than a first preset value, and/or a frequency gap between the first subband and the second subband is greater than a second preset value. In other words, the difference between the subcarrier spacings of the two subbands is made relatively small, and/or the frequency gap between the two subbands is made large enough. A relatively small difference between the subcarrier spacings of the two subbands can cause a small difference in duplicate transmission.

In an optional implementation, at least two RLC entities in the RLC entities on the first bearer that are included in the one or more access network devices perform duplicate transmission on transmission resources of different cell sets. Performing duplicate transmission on transmission resources of different cell sets helps improve the diversity gain of the data transmission.

In an optional implementation, the first bearer includes at least two RLC entities of the master access network device, and includes at least one RLC entity of the secondary access network device; or the first bearer includes at least two RLC entities of the secondary access network device, and includes at least one RLC entity of the master access network device; or the first bearer includes at least three RLC entities of the master access network device; or the first bearer includes at least three RLC entities of the secondary access network device.

According to a third aspect, an embodiment of this application provides a communication method. The method includes: receiving, by a first access network device, first indication information from a second access network device, where the first indication information is used to indicate an RLC entity, of a terminal device, that corresponds to the second access network device and whose duplicate transmission function needs to be activated or deactivated; and sending, by the first access network device, a first instruction to the terminal device, where the first instruction includes a first information element, and the first information element is used to activate or deactivate the duplicate transmission function of the RLC entity that is of the terminal device and that is indicated by the second access network device. Based on the method described in the third aspect, the first access network device can learn of the RLC entity, of the terminal device, that corresponds to the second access network device and whose duplicate transmission function needs to be activated or deactivated, so that the instruction that is sent by the first access network device and that is used to activate or deactivate the duplicate transmission function of the RLC entity that is of the terminal device and that corresponds to the second access network device can be consistent with an instruction that is sent by the second access network device and that is used to activate or deactivate the duplicate transmission function of the RLC entity that is of the terminal device and that corresponds to the second access network device.

In an optional implementation, the first access network device sends second indication information to the second access network device, where the second indication information is used to indicate an RLC entity, of the terminal device, that corresponds to the first access network device and whose duplicate transmission function needs to be activated or deactivated. Based on this implementation, the first access network device and the second access network device may agree upon an RLC entity that is of the terminal device and whose uplink duplicate transmission function is to be activated or deactivated, so that the instruction that is sent by the first access network device and that is used to activate or deactivate the duplicate transmission function of the RLC entity of the terminal device may be consistent with the instruction that is sent by the second access network device and that is used to activate or deactivate the duplicate transmission function of the RLC entity of the terminal device.

In an optional implementation, the first instruction further includes a second information element, and the second information element is used to activate or deactivate the RLC entity that has the duplicate transmission function and that is used for communication between the first access network device and the terminal device.

According to a fourth aspect, a terminal device is provided. The terminal device may perform the method in the first aspect or the possible implementations of the first aspect. The function may be implemented by hardware, or may be implemented by hardware executing corresponding software. The hardware or the software includes one or more units corresponding to the foregoing function. The unit may be software and/or hardware. Based on the same inventive concept, for problem-resolving principles and beneficial effects of the terminal device, refer to the first aspect or the possible implementations of the first aspect and the beneficial effects. Repeated descriptions are omitted.

According to a fifth aspect, an access network device is provided. The access network device includes: a processing module, configured to establish at least one RLC entity on a first bearer, where the first bearer includes at least three RLC entities of a terminal device, and includes at least three RLC entities of one or more access network devices in total; and a first communications module, configured to perform data transmission through at least one RLC entity on the first bearer.

In an optional implementation, a manner in which the first communications module performs data transmission through the at least one RLC entity on the first bearer is specifically: receiving a second data packet; and performing duplicate transmission on the second data packet through the at least one RLC entity on the first bearer.

In an optional implementation, the access network device further includes an indication module, configured to indicate, to an RLC entity in the at least one RLC entity, that the second data packet is a duplicated data packet.

In an optional implementation, the access network device further includes a notification module, configured to: when it is detected that a preset quantity of RLC entities on the first bearer have sent the second data packet, notify an RLC entity that has not sent the second data packet to delete the second data packet.

In an optional implementation, a transport block in which the second data packet is located does not include a data packet other than the second data packet.

In an optional implementation, the first communications module is further configured to receive a first data packet, where a transport block in which the first data packet is located does not include a data packet other than the first data packet. The processing module is further configured to combine the first data packet with a duplicated data packet that is of the first data packet and that is stored in the access network device.

In an optional implementation, the first communications module is further configured to send a configuration message to the terminal device, where the configuration message is used to indicate the terminal device to establish the at least three RLC entities on the first bearer, and includes identifiers of the to-be-configured RLC entities or logical channel identifiers.

In an optional implementation, the first communications module is further configured to send a first instruction to the terminal device, where the first instruction includes a bearer status field, the bearer status field includes at least one bit, the bearer status field corresponds to a bearer configured with a duplicate transmission function, each bit in the bearer status field corresponds to one RLC entity on the bearer, and the bit is used to indicate to activate or deactivate a duplicate transmission function of the corresponding RLC entity.

In an optional implementation, the first instruction further includes a bearer indication field, the bearer indication field includes at least one bit, and each bit corresponds to one bearer configured with a duplicate transmission function, and is used to indicate whether the first instruction includes a bearer status field corresponding to the bearer.

In an optional implementation, the first communications module is further configured to receive a first indication sent by the terminal device, where the first indication is used to indicate a quantity of bits of an unsent duplicated data packet in an RLC entity that is of the terminal device and whose duplicate transmission function is activated.

In an optional implementation, the access network device is a master access network device, and further includes a second communications module, configured to receive a second indication sent by a secondary access network device, where the second indication is used to indicate a quantity of bits of an unsent duplicated data packet in an RLC entity that is of the secondary access network device and whose duplicate transmission function is activated.

In an optional implementation, the access network device is a master access network device. The first communications module is further configured to send a second instruction to the terminal device, where the second instruction is used to instruct the terminal device to perform data transmission with a second access network device. The second communications module is configured to indicate the second access network device to perform data transmission with the terminal device through an RLC entity on the first bearer.

In an optional implementation, each RLC entity on the first bearer corresponds to one subband or one subband set, and at least two RLC entities of the one or more access network devices on the first bearer correspond to different subbands or different subband sets.

In an optional implementation, the first bearer includes at least two RLC entities of the master access network device and at least one RLC entity of the secondary access network device; or the first bearer includes at least two RLC entities of the secondary access network device and at least one RLC entity of the master access network device; or the first bearer includes at least three RLC entities of the master access network device; or the first bearer includes at least three RLC entities of the secondary access network device.

The access network device described in the fifth aspect may further perform the method in another possible implementation of the second aspect. Details are not described herein again. Based on the same inventive concept, for problem-resolving principles and beneficial effects of the access network device, refer to the second aspect or the possible implementations of the second aspect and the beneficial effects. Repeated descriptions are omitted.

According to a sixth aspect, an access network device is provided. The access network device includes: a first communications module, configured to receive first indication information from a second access network device, where the first indication information is used to indicate an RLC entity, of a terminal device, that corresponds to the second access network device and whose duplicate transmission function needs to be activated or deactivated; and a second communications module, configured to send a first instruction to the terminal device, where the first instruction includes a first information element, and the first information element is used to activate or deactivate the duplicate transmission function of the RLC entity that is of the terminal device and that is indicated by the second access network device.

In an optional implementation, the first communications module is further configured to send second indication information to the second access network device, where the second indication information is used to indicate an RLC entity, of the terminal device, that corresponds to the access network device and whose duplicate transmission function needs to be activated or deactivated.

In an optional implementation, the first instruction further includes a second information element, and the second information element is used to activate or deactivate the RLC entity that has the duplicate transmission function and that is used for communication between the access network device and the terminal device.

Based on the same inventive concept, for problem-resolving principles and beneficial effects of the access network device, refer to the third aspect or the possible implementations of the third aspect and the beneficial effects. Repeated descriptions are omitted.

According to a seventh aspect, a terminal device is provided. The terminal device includes a processor, a memory, and a communications interface. The processor, the communications interface, and the memory are connected to each other. The communications interface may be a transceiver. The communications interface is configured to implement communication with another network element (for example, an access network device). One or more programs are stored in the memory, and the processor invokes the program stored in the memory to implement the solution in the first aspect or the possible implementations of the first aspect. For a problem-resolving implementation and beneficial effects of the terminal device, refer to the first aspect or the possible implementations of the first aspect and the beneficial effects. Repeated descriptions are omitted.

According to an eighth aspect, an access network device is provided. The access network device includes a processor, a memory, and a communications interface. The processor, the communications interface, and the memory are connected to each other. The communications interface may be a transceiver. The communications interface is configured to implement communication with another network element (for example, an access network device). One or more programs are stored in the memory, and the processor invokes the program stored in the memory, to implement the solution in the second aspect, the third aspect, the possible implementations of the second aspect, or the possible implementations of the third aspect. For a problem-resolving implementation and beneficial effects of the access network device, refer to the second aspect, the third aspect, the possible implementations of the second aspect, or the possible implementations of the third aspect and the beneficial effects. Repeated descriptions are omitted.

According to a ninth aspect, a computer program product is provided. When the computer program product is run on a computer, the computer is enabled to perform the method in the first aspect, the second aspect, the third aspect, the possible implementations of the first aspect, the possible implementations of the second aspect, or the possible implementations of the third aspect.

According to a tenth aspect, a chip product is provided, to perform the method in the first aspect, the second aspect, the third aspect, the possible implementations of the first aspect, the possible implementations of the second aspect, or the possible implementations of the third aspect.

According to an eleventh aspect, a computer-readable storage medium is provided. The computer-readable storage medium stores an instruction. When the instruction is run on a computer, the computer is enabled to perform the method in the first aspect, the second aspect, the third aspect, the possible implementations of the first aspect, the possible implementations of the second aspect, or the possible implementations of the third aspect.

BRIEF DESCRIPTION OF DRAWINGS

FIG. 19, FIG. 20, and FIG. 21 are schematic diagrams of bits in first indication information according to an embodiment of this application;

DESCRIPTION OF EMBODIMENTS

The following further describes specific embodiments of this application in detail with reference to the accompanying drawings.

To improve data transmission reliability and reduce a data transmission latency, embodiments of this application provide a communication method and a related device.

To better understand the embodiments of this application, the following describes a system architecture to which the embodiments of this application are applicable.

Figure 1:
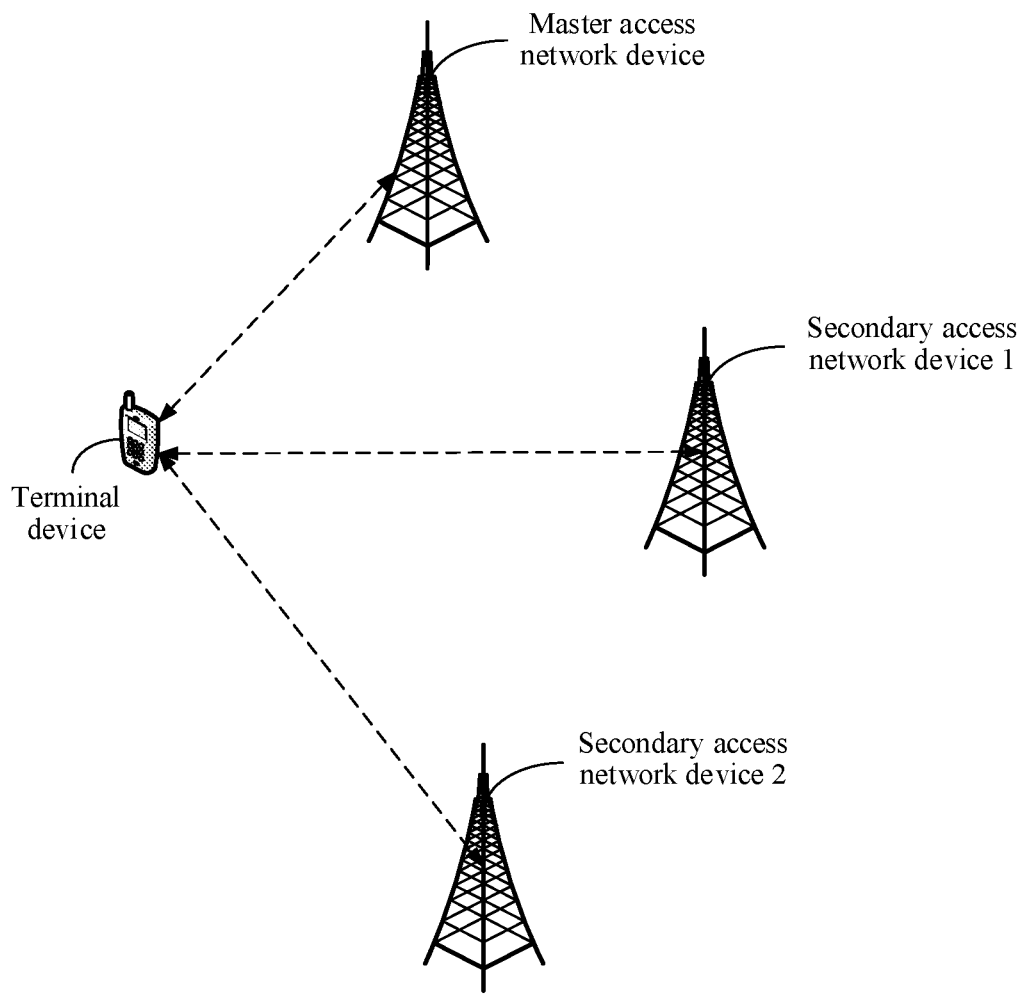
FIG. 1, FIG. 2, FIG. 3, FIG. 4 and FIG. 5 are schematic diagrams of system architectures according to an embodiment of this application.

FIG. 1 is a schematic diagram of a communications system according to an embodiment of this application. The communications system shown in FIG. 1 includes a master access network device, a secondary access network device, and a terminal device. Alternatively, the communications system may include only a master access network device. Alternatively, the communications system may include one secondary access network device or two or more secondary access network devices. An example in which the communications system includes one master access network device and two secondary access network devices is used in FIG. 1. For a bearer of a terminal, an access network device in which a PDCP entity is established is a master access network device, and an access network device in which no PDCP entity is established is a secondary access network device.

Different bearers may correspond to different master access network devices and different secondary access network devices. In addition, for another bearer, the secondary access network device may be a master access network device. In this embodiment of this application, an example in which the packet data convergence protocol (PDCP) layer is used as a control layer of duplicate transmission is used. Actually, another protocol layer such as a radio link control (RLC) layer (or entity) or a service data adaptation protocol (SDAP) layer (or entity) may alternatively be used as the control layer of the duplicate transmission.

Duplicate transmission may be performed between a terminal device and an access network device on a first bearer. The first bearer includes at least three RLC entities of the terminal device, and includes at least three RLC entities of one or more access network devices in total. The at least three RLC entities refer to three RLC entities or more than three RLC entities.

Figure 2:
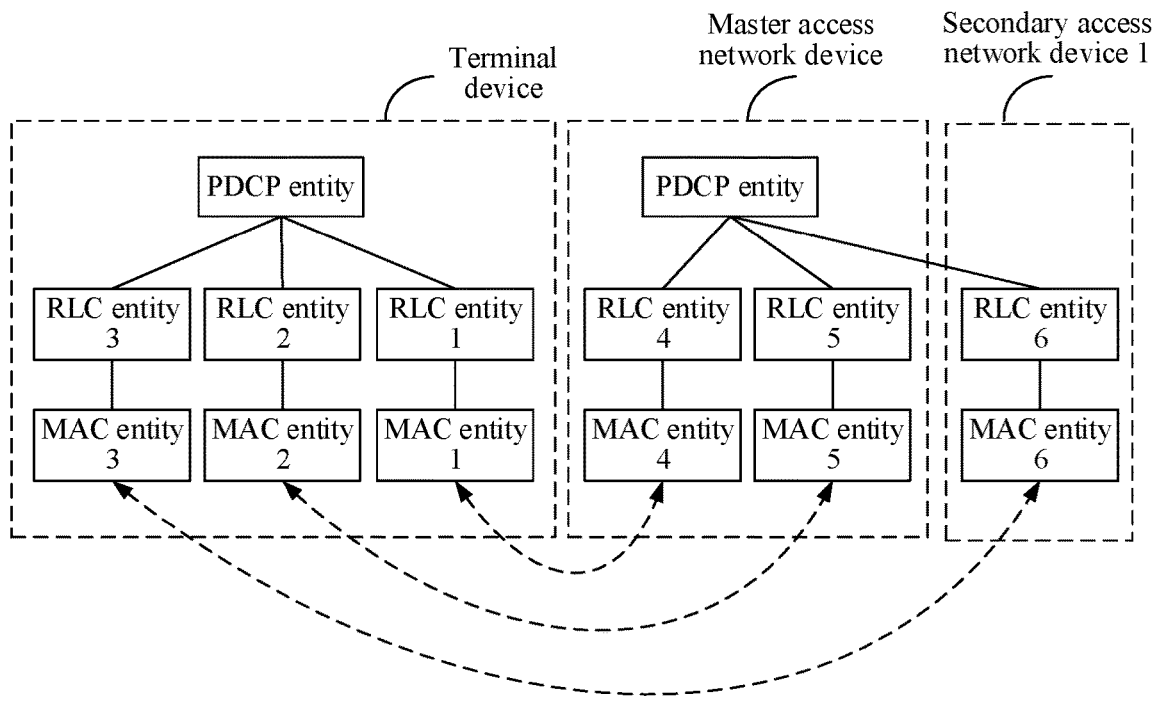

Optionally, the first bearer includes at least two RLC entities of a master access network device, and includes at least one RLC entity of a secondary access network device in total. For example, as shown in FIG. 2, the first bearer includes three RLC entities of the terminal device, includes two RLC entities of the master access network device, and includes one RLC entity of a secondary access network device 1.

Figure 3:
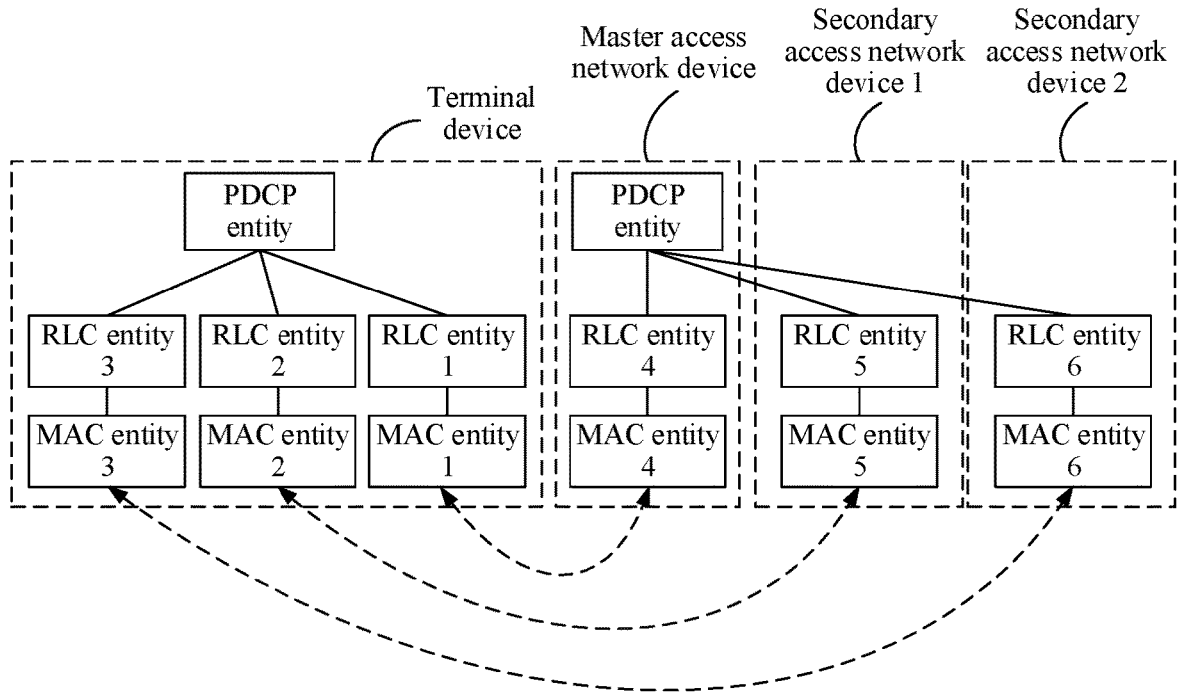

Optionally, the first bearer includes at least two RLC entities of a secondary access network device in total, and includes at least one RLC entity of a master access network device. For example, as shown in FIG. 3, the first bearer includes three RLC entities of the terminal device; includes one RLC entity of a secondary access network device 1, and includes one RLC entity of a secondary access network device 2, in other words, includes two RLC entities of the secondary access network devices in total; and includes one RLC entity of the master access network device.

Figure 4:
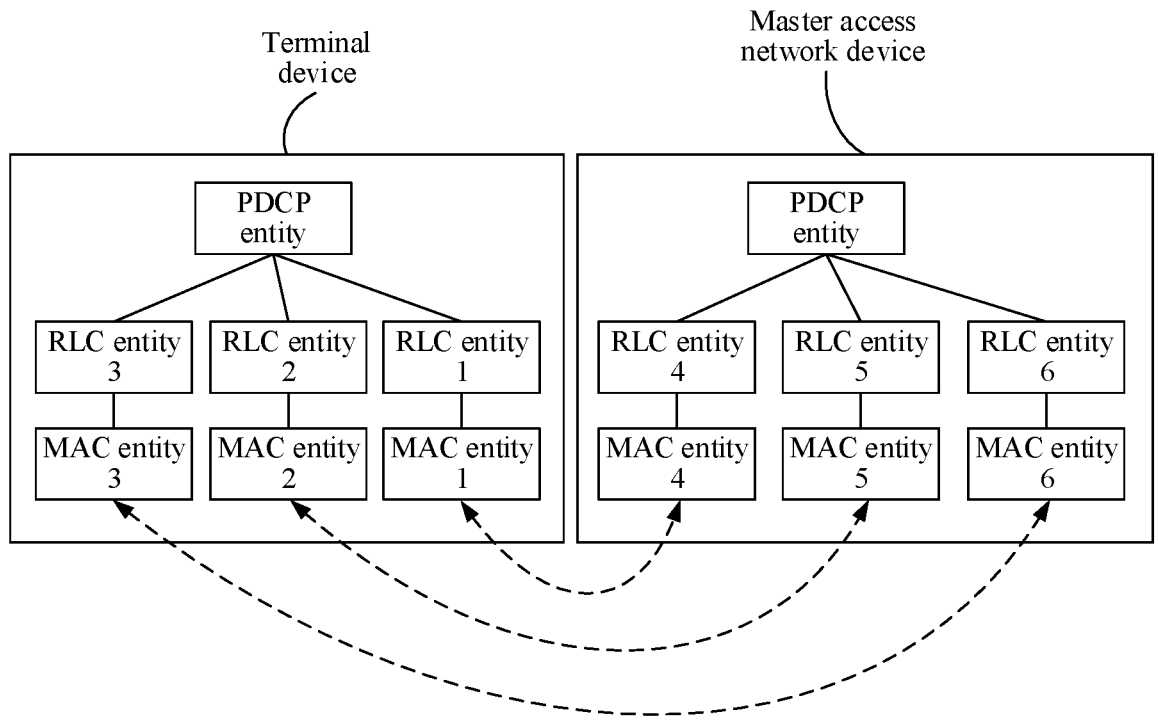

Optionally, the first bearer includes at least three RLC entities of a master access network device. For example, as shown in FIG. 4, the first bearer includes three RLC entities of the terminal device, and includes three RLC entities of the master access network device.

Figure 5:
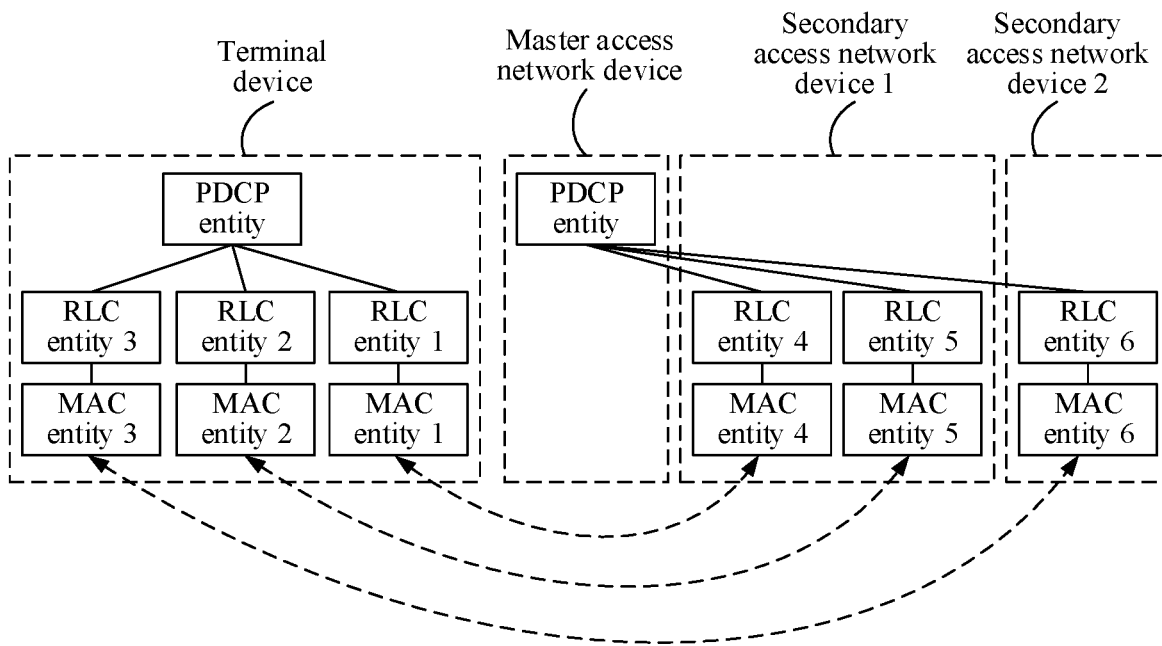

Optionally, the first bearer includes at least three RLC entities of a secondary access network device. For example, as shown in FIG. 5, the first bearer includes three RLC entities of the terminal device, and includes three RLC entities of a secondary access network device 1 and a secondary access network device 2 in total.

Optionally, a total quantity of RLC entities on the first bearer that are included in the one or more access network devices is greater than or equal to a quantity of RLC entities on the first bearer that are included in the terminal device. For example, the first bearer includes two RLC entities of the master access network device, includes one RLC entity of each of the secondary access network device 1 and the secondary access network device 2, and includes three RLC entities of the terminal device. In other words, the first bearer includes four RLC entities on an access network device side in total, and includes three RLC entities of the terminal device.

Optionally, as shown in FIG. 2 to FIG. 5, the terminal device and the access network device may further include a medium access control (MAC) entity. Alternatively, the terminal device and the access network device may not include a MAC entity. The terminal device and the access network device may further include a physical layer (PHY) layer or another entity that is not shown in FIG. 2 to FIG. 5.

The duplicate transmission may be performed between the terminal device and the access network device through the RLC entity on the first bearer. The duplicate transmission means that a transmit end transmits same data packets to a receive end through a plurality of RLC entities, so that a plurality of same data packets are transmitted, to improve data transmission reliability and reduce a data transmission latency. For example, as shown in FIG. 2 to FIG. 5, a PDCP entity of the terminal device may deliver a data packet 1 to an RLC entity 1 to an RLC entity 3, and duplicate transmission is performed on the data packet 1 through the RLC entity 1 to the RLC entity 3. For example, the RLC entity 1 sends the data packet 1 to an RLC entity 4, the RLC entity 2 sends the data packet 1 to an RLC entity 5, and the RLC entity 3 sends the data packet 1 to an RLC entity 6. The RLC entity 4 to the RLC entity 6 transfer the received three data packets 1 to a PDCP entity of the master access network device. The RLC entity 4 to the RLC entity 6 may not simultaneously receive the data packet 1, and therefore, may not simultaneously transfer the data packet 1 to the PDCP entity. Alternatively, only a part of the RLC entity 4 to the RLC entity 6 may transfer the data packet 1 to the PDCP entity. For example, when receiving the data packet 1 transferred by the first RLC entity, the PDCP entity may notify other RLC entities not to transfer the data packet 1. Similarly, the PDCP entity of the master access network device may deliver a data packet 2 to the RLC entity 4 to the RLC entity 6, and duplicate transmission is performed on the data packet 2 through the RLC entity 4 to the RLC entity 6. The RLC entity 4 sends the data packet 2 to the RLC entity 1, the RLC entity 5 sends the data packet 2 to the RLC entity 2, and the RLC entity 6 sends the data packet 2 to the RLC entity 3. The RLC entity 1 to the RLC entity 3 upload the received three data packets 2 to the PDCP entity of the terminal device. Similarly, the RLC entity 1 to the RLC entity 3 may not simultaneously receive the data packet 2, and therefore, may not simultaneously transfer the data packet 2 to the PDCP entity. Alternatively, only a part of the RLC entity 1 to the RLC entity 3 may transfer the data packet 2 to the PDCP entity. For example, when receiving the data packet 2 transferred by the first RLC entity, the PDCP entity may notify other RLC entities not to transfer the data packet 2.

The master access network device and the secondary access network device are access devices through which the terminal device accesses the mobile communications system in a wireless manner, and each may be a NodeB, an evolved NodeB eNodeB, a base station in a 5G mobile communications system, a base station in a future mobile communications system, an access node in a Wi-Fi system, or the like. A specific technology and a specific device form used by the access network device are not limited in the embodiments of this application.

The terminal device may be an access terminal, user equipment (UE), a subscriber unit, a subscriber station, a mobile station, a mobile station, a remote station, a remote terminal, a mobile terminal, a user terminal, a terminal, a wireless communications device, a user agent, or a user apparatus. The access terminal may be a cellular phone, a cordless telephone set, a session initiation protocol (SIP) phone, a wireless local loop (WLL) station, a personal digital assistant (PDA), a handheld device that has a wireless communication function, a computing device, another processing device connected to a wireless modem, a vehicle-mounted device, a wearable device, a terminal device in an internet of things, a virtual reality device, a terminal device in a 5G network, a terminal device in a future evolved public land mobile network (PLMN), or the like.

The master access network device, the secondary access network device, and the terminal device may be deployed on land, such as indoor or outdoor devices, handheld devices, or vehicle-mounted devices; may be deployed on water; or may be deployed on an airplane, a balloon, or a satellite in the air. Application scenarios of the master access network device, the secondary access network device, and the terminal device are not limited in the embodiments of this application.

The term "plurality of" means two or more, and other quantifiers have similar meanings. The term "and/or" describes an association relationship between associated objects and represents that three relationships may exist. For example, A and/or B may represent the following three cases: Only A exists, both A and B exist, and only B exists.

The following further describes the communication method and the related device that are provided in this application.

Figure 6:
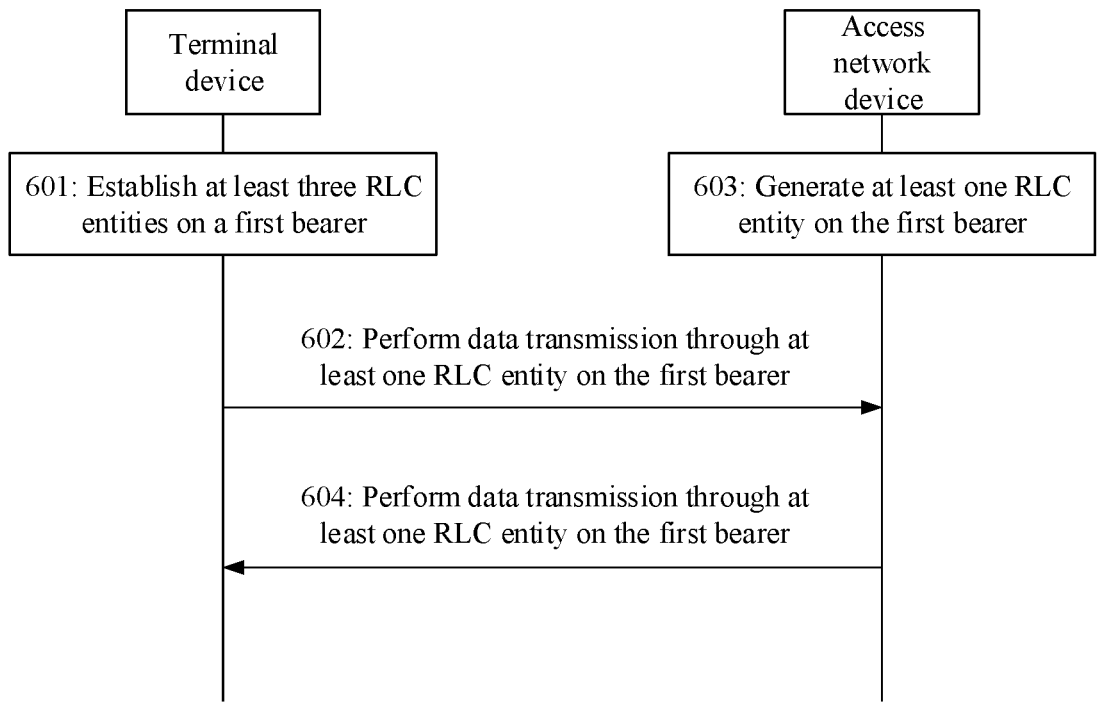
FIG. 6 is a schematic flowchart of a communication method according to an embodiment of this application.

FIG. 6 is a schematic diagram of a communication method according to an embodiment of this application. As shown in FIG. 6, the communication method includes the following steps 601 to 604.

601: A terminal device establishes at least three RLC entities on a first bearer.

As described above, the first bearer includes the at least three RLC entities of the terminal device, and includes at least three RLC entities of one or more access network devices in total. Therefore, the terminal device establishes the at least three RLC entities on the first bearer. For example, in FIG. 2 to FIG. 5, the terminal device generates three RLC entities on the first bearer.

602: The terminal device performs data transmission through at least one RLC entity on the first bearer.

The terminal device may perform duplicate transmission through at least two RLC entities on the first bearer, or may perform data transmission through one RLC entity on the first bearer.

For example, as shown in FIG. 2, the first bearer includes the three RLC entities of the terminal device, and the terminal device may perform duplicate transmission through the three RLC entities. To be specific, a PDCP entity of the terminal device may deliver a data packet 1 to an RLC entity 1 to an RLC entity 3. The data packet 1 is sent to a master access network device separately through the RLC entity 1 and the RLC entity 2, and is sent to a secondary access network device 1 through the RLC entity 3. Alternatively, the terminal device may perform duplicate transmission only through the RLC entity 1 and the RLC entity 2. To be specific, the PDCP entity of the terminal device may deliver a data packet 1 to the RLC entity 1 and the RLC entity 2. The data packet 1 is sent to the master access network device separately through the RLC entity 1 and the RLC entity 2. Alternatively, the terminal device may perform data transmission only through the RLC entity 1. To be specific, the PDCP entity of the terminal device may deliver a data packet 1 to the RLC entity 1. The data packet 1 is sent to the master access network device through the RLC entity 1.

Optionally, the terminal device may select a part of RLC entities from the first bearer for data transmission. For example, the terminal device may select, from the first bearer based on radio air interface quality of an RLC entity whose duplicate transmission function is activated and/or a quantity of bits of an unsent duplicated data packet in the RLC entity, an RLC entity used for data transmission. The duplicated data packet is a data packet on which duplicate transmission is to be performed, that is, a plurality of same data packets need to be transmitted. For example, if the PDCP entity delivers the data packet 1 to the RLC entity 1 and the RLC entity 2 for transmission, two data packets 1 need to be transmitted. Therefore, the data packet 1 is a duplicated data packet.

For example, as shown in FIG. 2, the first bearer includes the RLC entity 1 to the RLC entity 3 of the terminal device. Duplicate transmission functions of the RLC entity 1 to the RLC entity 3 are activated. Radio air interface quality of the RLC entity 1 reaches a preset threshold 1, and a quantity of bits of an unsent duplicated data packet in the RLC entity 1 is less than a preset threshold 2. Radio air interface quality of the RLC entity 2 reaches the preset threshold 1, and a quantity of bits of an unsent duplicated data packet in the RLC entity 2 is less than the preset threshold 2. Radio air interface quality of the RLC entity 3 does not reach the preset threshold 1, and a quantity of bits of an unsent duplicated data packet in the RLC entity 3 is greater than the preset threshold 2. The terminal device may select, based on the radio air interface quality of the RLC entity 1 to the RLC entity 3 and the quantity of bits of the unsent duplicated data packet in each of the RLC entity 1 to the RLC entity 3, the RLC entity 1 and the RLC entity 2 for duplicate transmission. To be specific, an RLC entity with good radio air interface quality that buffers a duplicated data packet with a small quantity of bits is selected from the first bearer, to perform data transmission. Selecting an RLC entity with good air interface quality for data transmission helps improve data transmission reliability, and selecting an RLC entity that buffers a duplicated data packet with a small quantity of bits helps reduce a data transmission latency.

603: An access network device establishes at least one RLC entity on the first bearer.

As described above, the first bearer includes the at least three RLC entities of the one or more access network devices in total. For example, the first bearer includes at least two RLC entities of the master access network device, and includes at least one RLC entity of a secondary access network device; or the first bearer includes at least two RLC entities of a secondary access network device, and includes at least one RLC entity of the master access network device; or the first bearer includes at least three RLC entities of the master access network device; or the first bearer includes at least three RLC entities of a secondary access network device. Therefore, the access network device in step 603 and step 604 may be a master access network device or a secondary access network device.

For example, as shown in FIG. 2, the master access network device needs to establish two RLC entities on the first bearer, and the secondary access network device 1 needs to establish one RLC entity on the first bearer. As shown in FIG. 3, the master access network device needs to establish one RLC entity on the first bearer, the secondary access network device 1 needs to establish one RLC entity on the first bearer, and a secondary access network device 2 needs to establish one RLC entity on the first bearer. As shown in FIG. 4, the master access network device needs to establish three RLC entities on the first bearer. As shown in FIG. 5, the secondary access network device 1 needs to establish two RLC entities on the first bearer, and a secondary access network device 2 needs to establish one RLC entity on the first bearer.

604: The access network device performs data transmission through at least one RLC entity on the first bearer.

In this embodiment of this application, after establishing the at least one RLC entity on the first bearer, the access network device performs duplicate transmission through the at least one RLC entity on the first bearer. The access network device may perform data transmission through all the RLC entities of the access network device on the first bearer, or may perform data transmission through a part of RLC entities of the access network device on the first bearer.

For example, as shown in FIG. 2, the master access network device generates an RLC entity 4 and an RLC entity 5 on the first bearer, and the secondary access network device 1 generates an RLC entity 6 on the first bearer. A PDCP entity of the master access network device delivers a data packet 2 to the RLC entity 4, the RLC entity 5, and the RLC entity 6. The RLC entity 4, the RLC entity 5, and the RLC entity 6 separately send the data packet 2 to the terminal device. In other words, the master access network device performs duplicate transmission through the RLC entity 4 and the RLC entity 5, and the secondary access network device performs duplicate transmission through the RLC entity 6. Alternatively, the PDCP entity of the master access network device may deliver a data packet 2 only to a part of the RLC entity 4 to the RLC entity 6, and data transmission is performed through the part of the RLC entity 4 to the RLC entity 6. For example, the PDCP entity of the master access network device may alternatively deliver the data packet 2 only to the RLC entity 4, and data transmission is performed through the RLC entity 4. Cases in FIG. 3 to FIG. 5 are similar to the case in FIG. 2, and details are not described herein again.

Optionally, the access network device may select the part of RLC entities from the first bearer for data transmission. For example, the access network device may select, from the first bearer based on radio air interface quality of an RLC entity whose duplicate transmission function is activated and/or a quantity of bits of an unsent duplicated data packet in the RLC entity, an RLC entity used for data transmission. For example, as shown in FIG. 2, the master access network device generates the RLC entity 4 and the RLC entity 5, and the secondary access network device generates the RLC entity 6. Duplicate transmission functions of the RLC entity 4 to the RLC entity 6 are activated. The secondary access network device may report, to the master access network device, a quantity of bits of an unsent duplicated data packet in the RLC entity 6. The master access network device selects, from the RLC entity 4 to the RLC entity 6 based on radio air interface quality of the RLC entity 4 to the RLC entity 6 and a quantity of bits of an unsent duplicated data packet in each of the RLC entity 4 to the RLC entity 6, an RLC entity with good radio air interface quality that buffers a duplicated data packet with a relatively small quantity of bits, to perform data transmission. For example, if the master access network device selects the RLC entity 4 and the RLC entity 6 for duplicate transmission, the PDCP entity of the master access network device delivers the data packet 2 to the RLC entity 4 and the RLC entity 6. The RLC entity 4 and the RLC entity 6 separately send the data packet 2 to the terminal device. Selecting an RLC entity with good air interface quality for transmission helps improve the data transmission reliability, and selecting an RLC entity that buffers a duplicated data packet with a small quantity of bits helps reduce the data transmission latency.

Figure 7:
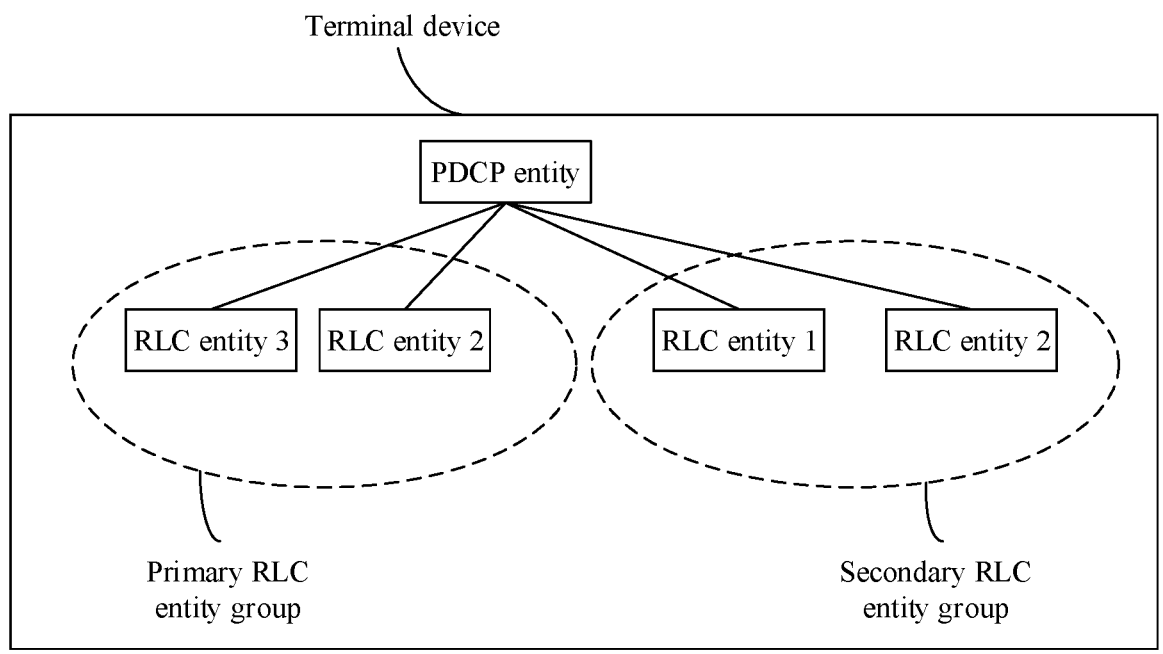
FIG. 7 is a schematic diagram of a primary RLC entity group and a secondary RLC entity according to an embodiment of this application.
Figure 8:
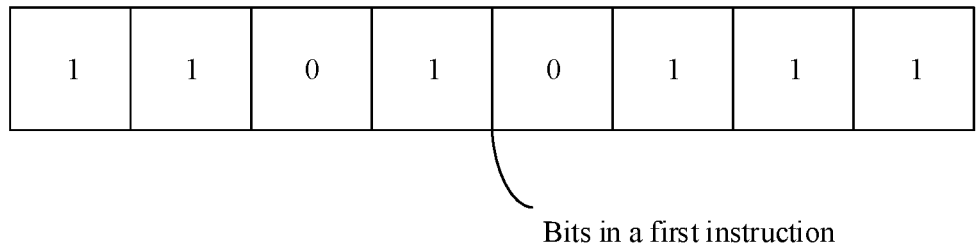
FIG. 8 is a schematic diagram of bits in a first instruction according to an embodiment of this application.

In an optional implementation, the RLC entities of the terminal device on the first bearer are grouped into a primary RLC entity group and a secondary RLC entity group. RLC entities in the two RLC entity groups are different, and activation states of duplicate transmission functions of RLC entities in a same RLC entity group are the same. Correspondingly, the terminal device may receive a first instruction, where the first instruction is used to activate or deactivate duplicate transmission functions in the RLC entity groups on the first bearer, that is, the duplicate transmission functions are activated or deactivated in a unit of an RLC entity group. The first instruction may be a MAC CE. For example, as shown in FIG. 7, the first bearer includes four RLC entities of the terminal device. An RLC entity 1 and an RLC entity 2 belong to a primary RLC entity group, and an RLC entity 3 and an RLC entity 4 belong to a secondary RLC entity group. FIG. 8 shows bits in the first instruction. In FIG. 8, the first bit in the first instruction is used to activate or deactivate the duplicate transmission functions in the RLC entity groups on the first bearer, and other bits are used to activate or deactivate duplicate transmission functions in RLC entity groups on other bearers. One bearer corresponds to one bit. When a value of the first bit is 1, the terminal device activates the duplicate transmission functions of the RLC entities in both the primary RLC entity group and the secondary RLC entity group. In other words, the PDCP entity of the terminal device may deliver a data packet to the RLC entities in the primary RLC entity group and the secondary RLC entity group, to perform duplicate transmission through the RLC entities in the primary RLC entity group and the secondary RLC entity group. When a value of the first bit is 0, the terminal device deactivates the duplicate transmission functions of all the RLC entities in the secondary RLC entity group, and the duplicate transmission functions of the RLC entities in the primary RLC entity group remain unchanged. In other words, the PDCP entity of the terminal device may deliver a data packet to the RLC entities in the primary RLC entity group, to perform duplicate transmission through the RLC entities in the primary RLC entity group. The RLC entities of the terminal device on the first bearer are grouped into the primary RLC entity group and the secondary RLC entity group, so that a format of the MAC CE in an existing protocol can remain unchanged.

Optionally, the primary RLC entity group and the secondary RLC entity group may be configured by a network side device. The network side device may be the access network device, a network management entity, or the like. For example, the network side device may indicate, by using RRC signaling, which RLC entity group is the primary RLC entity group and which RLC entity group is the secondary RLC entity group. Alternatively, the terminal device may determine, according to a preset rule, which RLC entity group is the primary RLC entity group and which RLC entity group is the secondary RLC entity group. For example, the terminal device may determine that an RLC entity group whose group number is smaller is the secondary RLC entity group, and an RLC entity group whose group number is larger is the primary RLC entity group.

In an optional implementation, each RLC entity on the first bearer corresponds to one subband or one subband set, and at least two RLC entities of the terminal device on the first bearer correspond to different subbands or different subband sets. Each RLC entity of the terminal device on the first bearer performs data transmission in the corresponding subband, or performs data transmission in a subband in the corresponding subband set. One cell may be divided into several bandwidth parts (BWP), and one bandwidth part is one subband. The subband set is a set including a plurality of subbands. Data transmission is performed in different subbands, to help improve a diversity gain of the data transmission.

For example, as shown in FIG. 2, the first bearer includes the RLC entity 1 to the RLC entity 3 of the terminal device. The RLC entity 1 corresponds to a subband 1, the RLC entity 2 corresponds to a subband 2, and the RLC entity 3 corresponds to a subband 3. The RLC entity 1 performs data transmission in the subband 1, the RLC entity 2 performs data transmission in the subband 2, and the RLC entity 3 performs data transmission in the subband 3. The subband 1 is different from the subband 2, and is the same as the subband 3. Alternatively, the subband 1, the subband 2, and the subband 3 are different from each other.

Optionally, the terminal device may receive configuration information that is used by the network side device to indicate the terminal device to establish the at least three RLC entities on the first bearer. After receiving the configuration information, the terminal device may perform step 601. The configuration information may include identifiers of subbands corresponding to the at least three RLC entities or identifiers of subband sets corresponding to the at least three RLC entities. In other words, the network side device may configure the subbands or the subband sets corresponding to the RLC entities of the terminal device on the first bearer. Certainly, the network side device may alternatively configure, by using other information, the subbands or the subband sets corresponding to the RLC entities of the terminal device on the first bearer.

Optionally, a first RLC entity and a second RLC entity of the terminal device on the first bearer correspond to different subbands, the first RLC entity corresponds to a first subband, the second RLC entity corresponds to a second subband, and a difference between a subcarrier spacing of the first subband and a subcarrier spacing of the second subband is less than a first preset value, and/or a frequency gap between the first subband and the second subband is greater than a second preset value. In other words, the difference between the subcarrier spacings of the two subbands is made relatively small, and/or the frequency gap between the two subbands is made large enough. A relatively small difference between the subcarrier spacings of the two subbands can cause a small difference in duplicate transmission. A large enough frequency gap between the two subbands can improve reliability of the duplicate transmission.

In an optional implementation, at least two RLC entities on the first bearer that are included in the terminal device perform duplicate transmission on transmission resources of different cell sets. For example, as shown in FIG. 2, the first bearer includes the RLC entity 1 to the RLC entity 3 of the terminal device. The RLC entity 1 performs duplicate transmission on a transmission resource of a cell set 1, the RLC entity 2 performs duplicate transmission on a transmission resource of a cell set 2, and the RLC entity 3 performs duplicate transmission on a transmission resource of a cell set 3. The cell set 1 is different from the cell set 2, and is the same as the cell set 3. Alternatively, the cell set 1, the cell set 2, and the cell set 3 are different from each other. Performing duplicate transmission on transmission resources of different cell sets helps improve the diversity gain of the data transmission.

In an optional implementation, the RLC entities of the one or more access network devices on the first bearer are grouped into a primary RLC entity group and a secondary RLC entity group. RLC entities in the two RLC entity groups are different, and activation states of duplicate transmission functions of RLC entities in a same RLC entity group are the same. Structures of the primary RLC entity group and the secondary RLC entity group on an access network device side are similar to the structures of the primary RLC entity group and the secondary RLC entity group of the terminal device, and details are not described herein again. Optionally, the access network device may alternatively determine, according to a preset rule, which RLC entity group is the primary RLC entity group and which RLC entity group is the secondary RLC entity group. For example, the access network device may determine that an RLC entity group whose group number is smaller is the secondary RLC entity group, and an RLC entity group whose group number is larger is the primary RLC entity group.

In an optional implementation, each RLC entity on the first bearer corresponds to one subband or one subband set, and at least two RLC entities of the one or more access network devices on the first bearer correspond to different subbands or different subband sets. Each RLC entity of the one or more access network devices on the first bearer performs data transmission in the corresponding subband, or performs data transmission in a subband in the corresponding subband set. In other words, at least two RLC entities on the first bearer that are included on the access network device side correspond to different subbands. For a principle of this optional implementation, refer to the foregoing descriptions corresponding to a terminal device side. Details are not described herein again. Performing duplicate transmission in different subbands helps improve a diversity gain of the data transmission.

Optionally, a first RLC entity and a second RLC entity on the access network device side and on the first bearer correspond to different subbands, the first RLC entity corresponds to a first subband, the second RLC entity corresponds to a second subband, and a difference between a subcarrier spacing of the first subband and a subcarrier spacing of the second subband is less than a first preset value, and/or a frequency gap between the first subband and the second subband is greater than a second preset value. In other words, the difference between the subcarrier spacings of the two subbands is made relatively small, and/or the frequency gap between the two subbands is made large enough. A relatively small difference between the subcarrier spacings of the two subbands can cause a small difference in duplicate transmission. For a principle of this optional implementation, refer to the foregoing descriptions corresponding to the terminal device side. Details are not described herein again. A large enough frequency gap between the two subbands can improve reliability of the duplicate transmission.

In an optional implementation, at least two RLC entities in the RLC entities on the first bearer that are included in the one or more access network devices perform duplicate transmission on transmission resources of different cell sets. For a principle of this optional implementation, refer to the foregoing descriptions corresponding to the terminal device side. Details are not described herein again. Performing duplicate transmission on transmission resources of different cell sets helps improve the diversity gain of the data transmission.

It can be learned that, by performing the method described in FIG. 6, the terminal device may establish the at least three RLC entities on the first bearer, and perform data transmission through the RLC entity on the first bearer. The access network device may establish the at least one RLC entity on the first bearer, and perform data transmission through the at least one RLC entity on the first bearer. Because the first bearer includes the at least three RLC entities of the terminal device, and includes the at least three RLC entities of the one or more access network devices in total, the terminal device or the access network device may send at least three same data packets on the first bearer, or may perform data transmission through the part of RLC entities with good air interface quality on the first bearer that buffer the duplicated data packet with the small quantity of bits. Therefore, implementation of the method described in FIG. 6 helps improve the data transmission reliability and reduce the data transmission latency.

Figure 9:
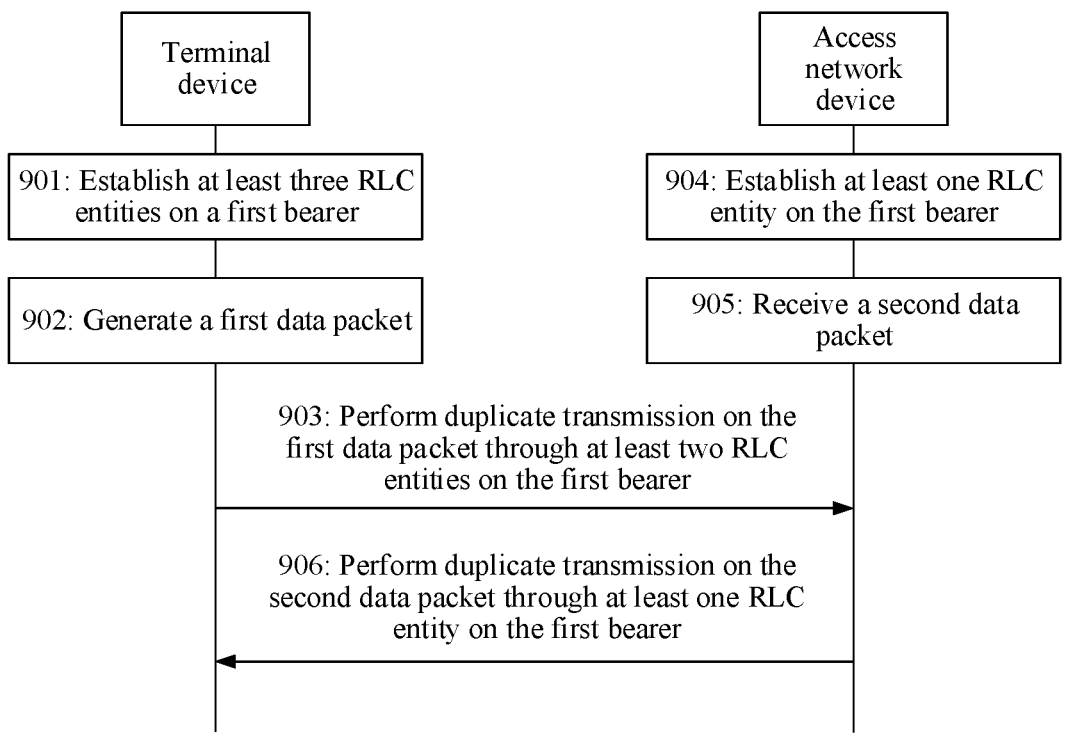
FIG. 9 is a schematic flowchart of another communication method according to an embodiment of this application.

FIG. 9 is a schematic diagram of another communication method according to an embodiment of this application. As shown in FIG. 9, the communication method includes the following steps 901 to 906. Step 902 and step 903 are specific implementations of step 602, and step 905 and step 906 are specific implementations of step 604.

901: A terminal device establishes at least three RLC entities on a first bearer.

In this embodiment of this application, a specific implementation of step 901 is the same as that of step 601. For details, refer to the descriptions corresponding to step 601, and the details are not described herein again.

902: The terminal device generates a first data packet.

903: The terminal device performs duplicate transmission on the first data packet through at least two RLC entities on the first bearer.

Specifically, after the terminal device generates the first data packet, a PDCP entity may deliver the first data packet to the at least two RLC entities of the terminal device on the first bearer. After receiving the first data packet, the at least two RLC entities perform duplicate transmission on the first data packet. The PDCP entity may deliver the first data packet to all the RLC entities or a part of RLC entities of the terminal device on the first bearer. The terminal device may perform duplicate transmission on the first data packet through all the RLC entities or the part of RLC entities on the first bearer.

For example, as shown in FIG. 2, after the terminal device generates the first data packet, the PDCP entity delivers the first data packet to an RLC entity 1 to an RLC entity 3. After receiving the first data packet separately through the RLC entity 1 to the RLC entity 3, the terminal device sends the first data packet separately through the RLC entity 1 to the RLC entity 3. Alternatively, the PDCP entity delivers the first data packet to the RLC entity 1 and the RLC entity 2. After receiving the first data packet separately through the RLC entity 1 and the RLC entity 2, the terminal device sends the first data packet separately through the RLC entity 1 and the RLC entity 2. Optionally, after delivering the first data packet to an RLC entity, the PDCP entity may further indicate whether the RLC entity needs to send the first data packet. For example, the PDCP entity delivers the first data packet to the RLC entity 1 and the RLC entity 2, and indicates whether the RLC entity 1 and the RLC entity 2 need to send the first data packet. Optionally, whether the RLC entity needs to send the first data packet may be notified through the PDCP layer or in another manner.

904: An access network device establishes at least one RLC entity on the first bearer.

In this embodiment of this application, a specific implementation of step 904 is the same as that of step 603. For details, refer to the descriptions corresponding to step 603, and the details are not described herein again.

905: The access network device receives a second data packet.

906: The access network device performs duplicate transmission on the second data packet through at least one RLC entity on the first bearer.

In this embodiment of this application, at least two RLC entities on an access network device side and on the first bearer receive the second data packet, and perform duplicate transmission on the second data packet.

For example, as shown in FIG. 2, after a master access network device generates the second data packet, a PDCP entity of the master access network device delivers the second data packet to an RLC entity 4 to an RLC entity 6. After the RLC entity 4 and the RLC entity 5 of the master access network device separately receive the second data packet, the master access network device sends the second data packet separately through the RLC entity 4 and the RLC entity 5, to perform duplicate transmission on the second data packet through the RLC entity 4 and the RLC entity 5. After the RLC entity 6 of a secondary access network device 1 receives the second data packet, the secondary access network device 1 sends the second data packet through the RLC entity 6, to perform duplicate transmission on the second data packet through the RLC entity 6. Alternatively, after the master access network device generates the second data packet, the PDCP entity of the master access network device delivers the second data packet to the RLC entity 4 and the RLC entity 6. After the RLC entity 4 of the master access network device receives the second data packet, the master access network device sends the second data packet through the RLC entity 4, to perform duplicate transmission on the second data packet through the RLC entity 4. After the RLC entity 6 of the secondary access network device 1 receives the second data packet, the secondary access network device 1 sends the second data packet through the RLC entity 6, to perform duplicate transmission on the second data packet through the RLC entity 6. Optionally, after delivering the second data packet to an RLC entity, the PDCP entity may further indicate whether the RLC entity needs to send the second data packet. For example, the PDCP entity delivers the second data packet to the RLC entity 4 and the RLC entity 6, and indicates whether the RLC entity 4 and the RLC entity 6 need to send the second data packet. Optionally, whether the RLC entity needs to send the second data packet may be notified through the PDCP layer or in another manner.

It can be learned that by performing the method described in FIG. 9, the terminal device or the access network device may send at least three same data packets on the first bearer, or may perform duplicate transmission through the part of RLC entities with good air interface quality on the first bearer that buffer a duplicated data packet with a small quantity of bits. Therefore, implementation of the method described in FIG. 9 helps improve data transmission reliability and reduce a data transmission latency.

In an optional implementation, the terminal device further indicates, to an RLC entity in the at least two RLC entities in step 903, that the first data packet is a duplicated data packet. In other words, the terminal device further indicates, to an RLC entity in the at least two RLC entities that perform duplicate transmission, that the first data packet is a duplicated data packet. Specifically, the terminal device may indicate, to all the at least two RLC entities, that the first data packet is a duplicated data packet. The terminal device may indicate, to a part of the at least two RLC entities, that the first data packet is a duplicated data packet. The terminal device may indicate, to a preset quantity of RLC entities in the at least two RLC entities, that the first data packet is a duplicated data packet. The preset quantity may be preconfigured by the access network device.

For example, as shown in FIG. 2, after the terminal device generates the first data packet, the PDCP entity of the terminal device delivers the first data packet to the RLC entity 1 to the RLC entity 3, and notifies the RLC entity 1 to the RLC entity 3 that the first data packet is a duplicated data packet. Alternatively, the PDCP entity of the terminal device notifies only the RLC entity 1 and the RLC entity 2 that the first data packet is a duplicated data packet. Alternatively, the PDCP entity of the terminal device notifies only the RLC entity 1 that the first data packet is a duplicated data packet. In this way, the RLC entity 1 to the RLC entity 3 can distinguish which data packets are duplicated data packets and which data packets are non-duplicated data packets, so that a duplicated data packet can be discarded when the duplicated data packet is not sent in time.

In an optional implementation, the terminal device may further receive a first instruction that is sent by the access network device and that is used to activate or deactivate duplicate transmission functions of the RLC entities on the first bearer. After receiving the first instruction, the terminal device may notify the RLC entities on the first bearer that the first instruction is received. The first instruction may be a MAC CE or another instruction. Specifically, the terminal device may notify, through a MAC entity or another entity, the RLC entities on the first bearer that the first instruction is received. For example, as shown in FIG. 2, the terminal device may receive, through a MAC entity 1 and a MAC entity 2, a first instruction sent by the master access network device. The terminal device may receive, through a MAC entity 3, a first instruction sent by the secondary access network device 1. The MAC entity 1 notifies the RLC entity 1 of the first instruction, the MAC entity 2 notifies the RLC entity 2 of the first instruction, and the MAC entity 3 notifies the RLC entity 3 of the first instruction. If the first instruction is used to activate duplicate transmission functions of the RLC entity 1 to the RLC entity 3, the RLC entity 1 to the RLC entity 3 may determine that all subsequently received data packets are duplicated data packets. If the first instruction is used to deactivate duplicate transmission functions of the RLC entity 1 to the RLC entity 3, the RLC entity 1 to the RLC entity 3 may determine that all subsequently received data packets are non-duplicated data packets. If the first instruction is used to activate duplicate transmission functions of the RLC entity 2 and the RLC entity 3, the RLC entity 2 and the RLC entity 3 may determine that all subsequently received data packets are duplicated data packets. If the first instruction is used to deactivate duplicate transmission functions of the RLC entity 2 and the RLC entity 3, the RLC entity 2 and the RLC entity 3 may determine that all subsequently received data packets are non-duplicated data packets. In this way, the RLC entity 1 to the RLC entity 3 can distinguish which data packets are duplicated data packets and which data packets are non-duplicated data packets, so that a duplicated data packet can be discarded when the duplicated data packet is not sent in time.

In an optional implementation, the access network device further indicates, to an RLC entity in the at least one RLC entity in step 906, that the second data packet is a duplicated data packet. In other words, the access network device further indicates, to an RLC entity in the at least one RLC entity that performs duplicate transmission, that the second data packet is a duplicated data packet. In this implementation, the access network device is a master access network device. Specifically, the access network device may indicate, to all the at least one RLC entity, that the second data packet is a duplicated data packet. The access network device may indicate, to a part of the at least one RLC entity, that the second data packet is a duplicated data packet. The access network device may indicate, to a preset quantity of RLC entities in the at least one RLC entity, that the second data packet is a duplicated data packet.

For example, as shown in FIG. 2, after the master access network device generates the second data packet, the PDCP entity delivers the second data packet to the RLC entity 4 to the RLC entity 6, and notifies the RLC entity 4 to the RLC entity 6 that the second data packet is a duplicated data packet. Alternatively, the PDCP entity of the master access network device notifies only the RLC entity 4 and the RLC entity 5 that the second data packet is a duplicated data packet. Alternatively, the PDCP entity of the master access network device notifies only the RLC entity 4 that the second data packet is a duplicated data packet. In this way, the RLC entity 4 to the RLC entity 6 can distinguish which data packets are duplicated data packets and which data packets are non-duplicated data packets, so that a duplicated data packet can be discarded when the duplicated data packet is not sent in time.

In an optional implementation, when detecting that a preset quantity of RLC entities on the first bearer have sent the first data packet, the terminal device notifies an RLC entity that has not sent the first data packet to delete the first data packet. Optionally, the terminal device may notify, through an upper-layer entity of the RLC entity, the RLC entity that has not sent the first data packet to delete the first data packet. The upper-layer entity may be the PDCP entity or another upper-layer entity of the RLC entity. Alternatively, after sending the first data packet, an RLC entity on the first bearer may notify another RLC entity on the first bearer that the first data packet has been sent. An RLC entity may count, after receiving a notification that is sent by another RLC entity and that is used to notify that the first data packet has been sent, a quantity of RLC entities that have sent the first data packet. If the quantity reaches the preset quantity, the RLC entity deletes and does not send the first data packet. This implementation is implemented, so that the data transmission latency is reduced.

For example, as shown in FIG. 2, after the terminal device generates the first data packet, the PDCP entity of the terminal device delivers the first data packet to the RLC entity 1 to the RLC entity 3. If the PDCP entity of the terminal device detects that the RLC entity 1 and the RLC entity 2 have sent the first data packet, in other words, the PDCP entity of the terminal device detects that two RLC entities have sent the first data packet, the terminal device notifies, through the PDCP entity, the RLC entity 3 to delete the first data packet, so that the RLC entity 3 does not need to send the first data packet.

In an optional implementation, when detecting that a preset quantity of RLC entities on the first bearer have sent the second data packet, the access network device notifies an RLC entity that has not sent the second data packet to delete the second data packet. Optionally, the access network device may notify, through an upper-layer entity of the RLC entity, the RLC entity that has not sent the second data packet to delete the second data packet. The access network device may be a master access network device, and the upper-layer entity of the RLC entity may be the PDCP entity or another upper-layer entity of the RLC entity. Alternatively, after sending the second data packet, an RLC entity on the first bearer may notify another RLC entity on the first bearer that the second data packet has been sent. An RLC entity may count, after receiving a notification that is sent by another RLC entity and that is used to notify that the first data packet has been sent, a quantity of RLC entities that have sent the first data packet. If the quantity reaches the preset quantity, the RLC entity deletes and does not send the first data packet.

For example, as shown in FIG. 2, after the master access network device generates the second data packet, the PDCP entity of the master access network device delivers the second data packet to the RLC entity 4 to the RLC entity 6. If the PDCP entity of the master access network device detects that the RLC entity 4 and the RLC entity 6 have sent the second data packet, in other words, the PDCP entity of the master access network device detects that two RLC entities have sent the second data packet, the master access network device notifies, through the PDCP entity, the RLC entity 5 to delete the second data packet, so that the RLC entity 5 does not need to send the second data packet. This implementation is implemented, so that the data transmission latency is reduced.

In an optional implementation, a transport block in which the first data packet is located does not include a data packet other than the first data packet. Correspondingly, the access network device receives the first data packet, and combines the first data packet with a duplicated data packet that is of the first data packet and that is stored in the access network device. The access network device may be a master access network device or a secondary access network device. Optionally, the access network device specifically combines, through a MAC entity, the first data packet received this time with the duplicated data packet that is of the first data packet and that is stored in the access network device. Combining the first data packet received this time with the duplicated data packet that is of the first data packet and that is stored in the access network device helps improve a combining gain.

Figure 10:
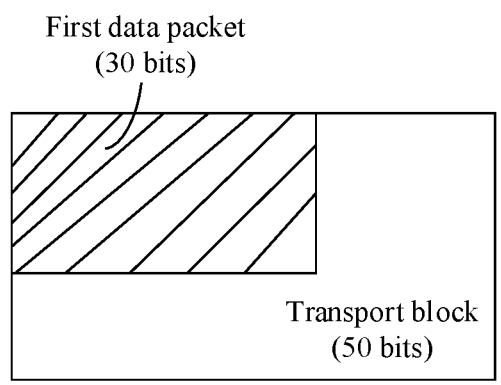
FIG. 10 is a schematic diagram of a transport block according to an embodiment of this application.

For example, if the first data packet is 30 bits, and a data block may be used to transmit 50-bit data, as shown in FIG. 10, the first data packet pads only a part of physical resource blocks (PRB) of the data block, and the other part of PRBs are not padded. Because the transport block in which the first data packet is located does not include the data packet other than the first data packet, after receiving transport blocks in which a plurality of first data packets are located, the access network device can combine the received plurality of first data packets. The duplicated data packet that is of the first data packet and that is stored in the access network device may be a first data packet received for the first time. For example, the RLC entity 1 to the RLC entity 3 of the terminal device send the first data packet to the master access network device. The master access network device first receives the first data packet sent by the RLC entity 1, and stores the first data packet sent by the RLC entity 1. The master access network device then receives the first data packet sent by the RLC entity 2. The master access network device combines the first data packet sent by the RLC entity 2 with the first data packet sent by the RLC entity 1, to obtain a first data packet after the combination. If accuracy of the first data packet obtained after the combination does not reach a preset threshold, after receiving the first data packet sent by the RLC entity 3, the master access network device combines the first data packet obtained after the combination with the first data packet sent by the RLC entity 3. By analogy, when accuracy of a first data packet obtained through direct combination reaches the preset threshold, combination on the received first data packet may be stopped.

In an optional implementation, a transport block in which the second data packet is located does not include a data packet other than the second data packet. Correspondingly, the terminal device receives the second data packet, and combines the second data packet received this time with a duplicated data packet that is of the second data packet and that is stored in the terminal device. Optionally, the terminal device specifically combines, through the MAC entity, the second data packet received this time with the duplicated data packet that is of the second data packet and that is stored in the terminal device. A principle of combining the second data packet by the terminal device is similar to the principle of combining the first data packet by the access network device. Details are not described herein again. Combining the second data packet received this time with the duplicated data packet that is of the second data packet and that is stored in the terminal device helps improve a combining gain.

Optionally, the access network device may further send a target indication, where the target indication is used to indicate a time-frequency resource of a second data packet sent last time and an identifier of a cell in which the second data packet is sent last time, or the target indication is used to indicate a hybrid automatic repeat request (HARQ) process identifier of a second data packet sent last time and an identifier of a cell in which the second data packet is sent last time, or the target indication is used to indicate a HARQ process identifier and a subband identifier that are of a second data packet sent last time. The target indication may be downlink control information (DCI). The access network device may be a master access network device or a secondary access network device. Correspondingly, the terminal device may receive the target indication, so that the terminal device can find, based on the target indication, the duplicated data packet that is of the second data packet and that is stored in the terminal device, to combine the second data packet stored in the terminal device with the second data packet received this time.

Figure 11:
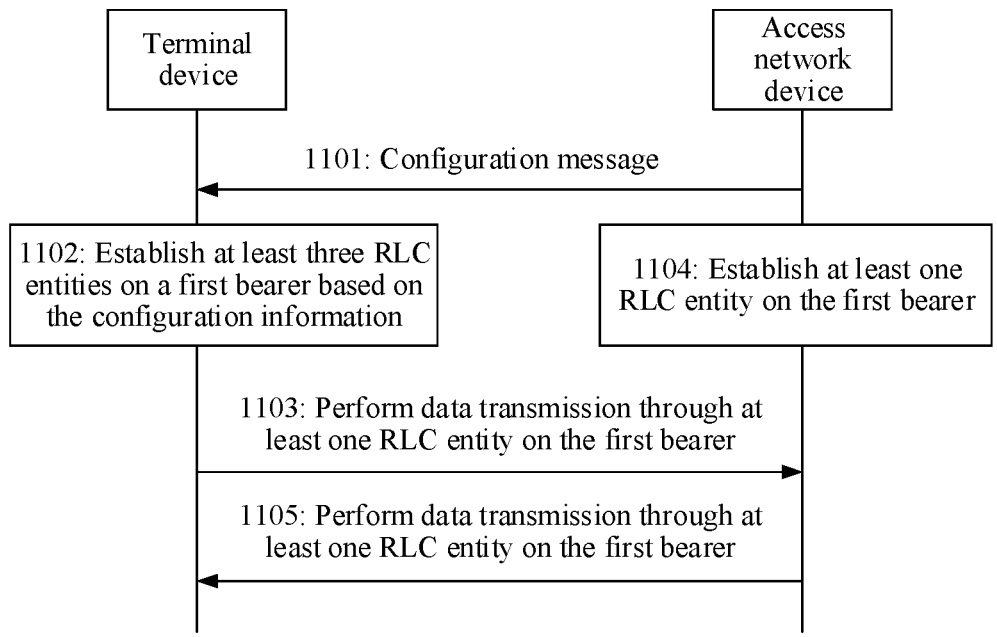
FIG. 11 is a schematic flowchart of still another communication method according to an embodiment of this application.

FIG. 11 is a schematic diagram of another communication method according to an embodiment of this application. The communication method described in FIG. 11 may alternatively be combined with the communication method described above. As shown in FIG. 11, the communication method includes the following steps 1101 to 1105.

1101: An access network device sends a configuration message to a terminal device.

The configuration message is used to indicate the terminal device to establish at least three RLC entities on a first bearer. Alternatively, the configuration message is used to configure at least three RLC entities on a first bearer. Optionally, the configuration message includes identifiers of the to-be-configured RLC entities or logical channel identifiers. The to-be-configured RLC entities are the RLC entities that the terminal device is indicated by using the configuration information to establish. The configuration message may alternatively be sent by another network side device to the terminal device. For example, the configuration message may be sent by a network management entity to the terminal device. An example in which the access network device sends the configuration message to the terminal device is used in FIG. 11. The access network device in step 1101 may be a master access network device or a secondary access network device. The identifiers of the RLC entities are information that can be used to distinguish between the RLC entities. The RLC entities may correspond to different logical channel identifiers. Therefore, the RLC entities may be distinguished by using the logical channel identifiers.

1102: The terminal device establishes the at least three RLC entities on the first bearer based on the configuration information.

After receiving the configuration message, the terminal device establishes the at least three RLC entities on the first bearer. For example, the configuration message is used to configure an RLC entity 1 to an RLC entity 3 on the first bearer, and the configuration message includes identifiers of the RLC entity 1 to the RLC entity 3 or corresponding logical channel identifiers. After receiving the configuration message, the terminal device establishes the RLC entity 1 to the RLC entity 3 on the first bearer.

In an optional implementation, the configuration message may further include a third indication, where the third indication is used to indicate initial activation states of duplicate transmission functions of the to-be-configured RLC entities. For example, the configuration message is used to configure the RLC entity 1 to the RLC entity 3 on the first bearer. The configuration message may further include a first indication, where the first indication may indicate that initial activation states of duplicate transmission functions of the RLC entity 1 and the RLC entity 2 are active, and may indicate that an initial activation state of a duplicate transmission function of the RLC entity 3 is inactive. After receiving the configuration message, the terminal device may determine the initial activation states of the duplicate transmission functions of the RLC entity 1 to the RLC entity 3 based on the first indication.

In an optional implementation, the terminal device may alternatively determine, according to a preset rule, initial activation states of duplicate transmission functions of the established at least three RLC entities. For example, the terminal device may determine that an initial activation state of a duplicate transmission function of an RLC entity corresponding to a smallest logical channel identifier is active, and initial activation states of duplicate transmission functions of the other RLC entities are inactive. Alternatively, the terminal device may determine that an initial activation state of a duplicate transmission function of an RLC entity corresponding to a logical channel identifier that is greater than a preset threshold is active, and an initial activation state of a duplicate transmission function of an RLC entity corresponding to a logical channel identifier that is less than the preset threshold is inactive.

1103: The terminal device performs data transmission through at least one RLC entity on the first bearer.

1104: The access network device establishes at least one RLC entity on the first bearer.

Step 1101 may be performed before step 1104, or may be performed after step 1104 and before step 1105.

1105: The access network device performs data transmission through at least one RLC entity on the first bearer.

For specific implementations of step 1103 to step 1105, refer to the descriptions corresponding to step 602 to step 604, and details are not described herein again.

It can be learned that, by performing the method described in FIG. 11, a network side device may configure the at least three RLC entities on the first bearer for the terminal device.

In an optional implementation, the access network device may send a first instruction to the terminal device, where the first instruction includes a bearer status field, the bearer status field includes at least one bit, the bearer status field corresponds to a bearer configured with a duplicate transmission function, each bit in the bearer status field corresponds to one RLC entity on the bearer, and the bit is used to indicate to activate or deactivate a duplicate transmission function of the corresponding RLC entity. Correspondingly, the terminal device may receive the first instruction. After receiving the first instruction, the terminal device activates or deactivates, according to the first instruction, the duplicate transmission function of the RLC entity on the bearer configured with the duplicate transmission function. Optionally, the first instruction may be a MAC CE. Optionally, there may be one or more bearer status fields. Different bearer status fields may include a same quantity of bits or different quantities of bits. A quantity of bits included in the bearer status field may be the same as or different from a quantity of RLC entities on the corresponding bearer. Based on this implementation, the duplicate transmission function of the RLC entity on the bearer configured with the duplicate transmission function can be activated or deactivated.

Figure 12:
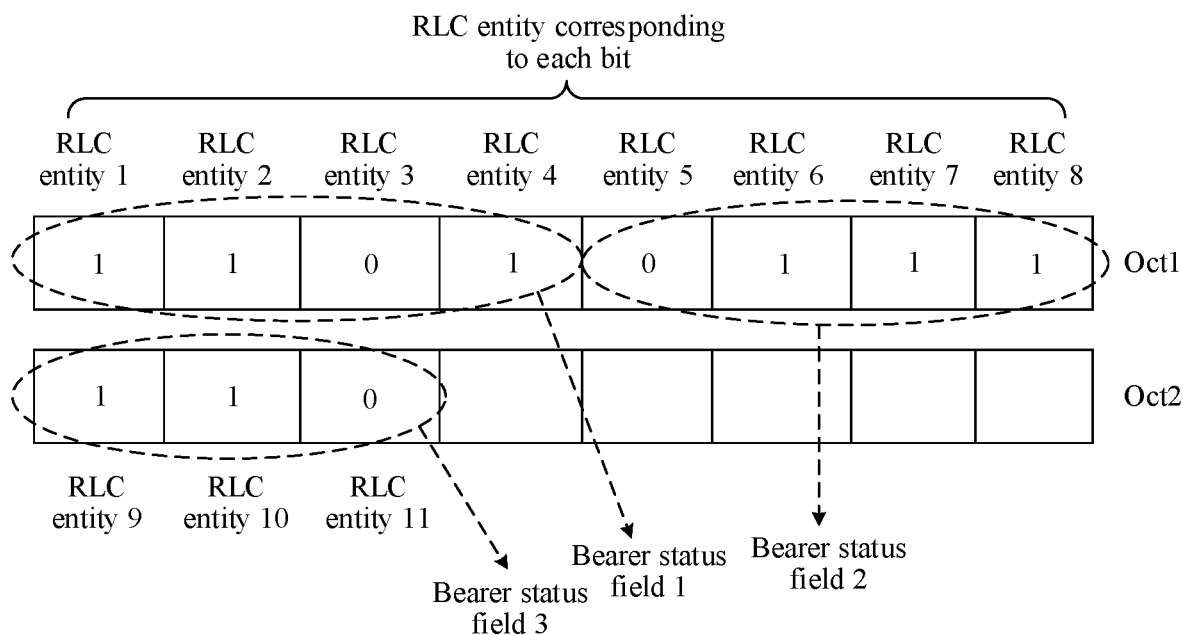
FIG. 12, FIG. 13, FIG. 14, FIG. 15, FIG. 16 and FIG. 17 are schematic diagrams of bits in a first instruction according to an embodiment of this application.

For example, the terminal device performs duplicate transmission separately on a bearer 1 to a bearer 3, in other words, duplicate transmission functions are configured for the bearer 1 to the bearer 3. The bearer 1 includes four RLC entities of the terminal device, that is, an RLC entity 1 to an RLC entity 4. The bearer 2 includes four RLC entities of the terminal device, that is, an RLC entity 5 to an RLC entity 8. The bearer 3 includes three RLC entities of the terminal device, that is, an RLC entity 9 to an RLC entity 11. The access network device sends the first instruction to the terminal device. As shown in FIG. 12, the first octet (oct1) of the first instruction includes a bearer status field 1 and a bearer status field 2. The second octet (oct2) of the first instruction includes a bearer status field 3. The first bit in the bearer status field 1 corresponds to the RLC entity 1, and by analogy, the fourth bit corresponds to the RLC entity 4. The first bit in the bearer status field 2 corresponds to the RLC entity 5, and by analogy, the fourth bit corresponds to the RLC entity 8. The first bit in the bearer status field 3 corresponds to the RLC entity 9, and by analogy, the third bit corresponds to the RLC entity 11. The bit corresponding to the RLC entity 1 is used to activate or deactivate a duplicate transmission function of the RLC entity 1. For example, when the bit corresponding to the RLC entity 1 is 1, the bit is used to activate the duplicate transmission function of the RLC entity 1. When the bit corresponding to the RLC entity 1 is 0, the bit is used to deactivate the duplicate transmission function of the RLC entity 1. A bit corresponding to another RLC entity is used in the similar way, and details are not described herein again. In addition, on the contrary, 0 may alternatively represent activation, and 1 may alternatively represent deactivation. A case in the following embodiment is similar to the case herein.

Figure 13:
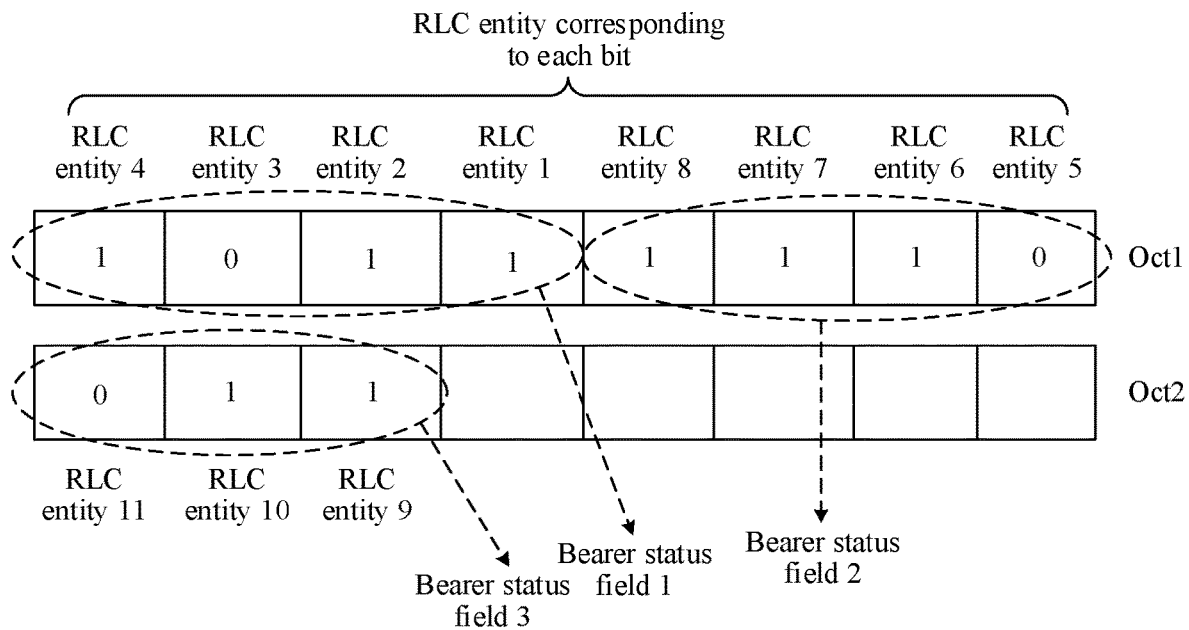

Optionally, the bits in the bearer status field are sorted in ascending order of logical channel identifiers corresponding to the RLC entities, or are sorted in descending order of values of logical channel identifiers corresponding to the RLC entities. For example, logical channel identifiers corresponding to the RLC entity 1 to the RLC entity 11 are in descending order. If the bits in the bearer status field are sorted in ascending order of the logical channel identifiers corresponding to the RLC entities, as shown in FIG. 12, the bit corresponding to the RLC entity 1, a bit corresponding to the RLC entity 2, a bit corresponding to the RLC entity 3, and the bit corresponding to the RLC entity 4 are sorted in sequence in the bearer status field 1. The bits in the bearer status field 2 and the bearer status field 3 are sorted in the similar way. If the bits in the bearer status field are sorted in descending order of the values of the logical channel identifiers corresponding to the RLC entities, as shown in FIG. 13, the bit corresponding to the RLC entity 4, a bit corresponding to the RLC entity 3, a bit corresponding to the RLC entity 2, and the bit corresponding to the RLC entity 1 are sorted in sequence in the bearer status field 1. The bits in the bearer status field 2 and the bearer status field 3 are sorted in the similar way.

Figure 14:
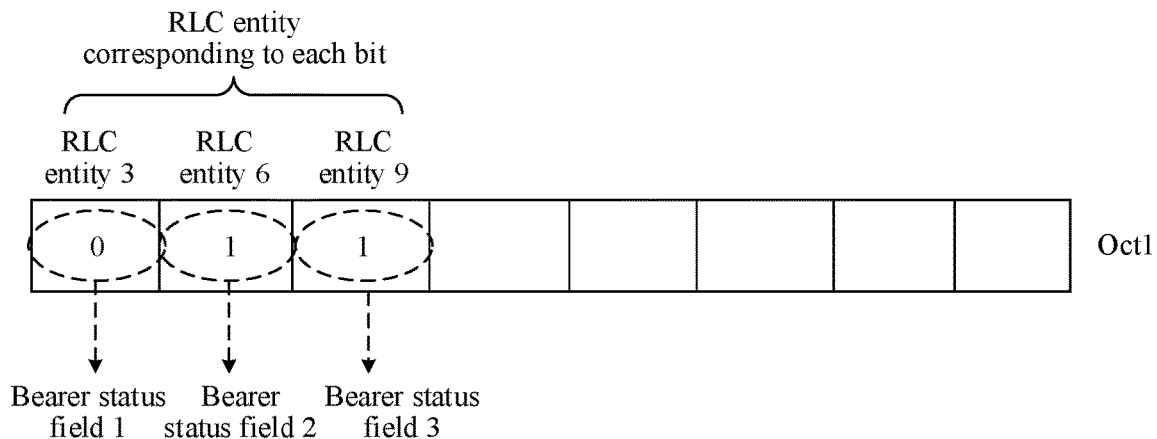

Optionally, the RLC entities included on the bearer corresponding to the bearer status field are classified into a primary RLC entity and a secondary RLC entity. The first instruction is used to activate or deactivate a duplicate transmission function of the secondary RLC entity, that is, each bit in the bearer status field corresponds to one secondary RLC entity on the bearer. For example, the RLC entity 3 on the bearer 1 is a secondary RLC entity. The RLC entity 6 on the bearer 2 is a secondary RLC entity. The RLC entity 9 on the bearer 3 is a secondary RLC entity. As shown in FIG. 14, the RLC entity 3 corresponds to one bit in the bearer status field 1. The RLC entity 6 corresponds to one bit in the bearer status field 2. The RLC entity 9 corresponds to one bit in the bearer status field 3. The bit corresponding to the RLC entity 3 is used to activate or deactivate a duplicate transmission function of the RLC entity 3. A bit corresponding to another RLC entity is used in the similar way, and details are not described herein again.

In an optional implementation, the first instruction further includes a bearer indication field, the bearer indication field includes at least one bit, and each bit corresponds to one bearer configured with a duplicate transmission function, and is used to indicate whether the first instruction includes a bearer status field corresponding to the bearer.

Figure 15:
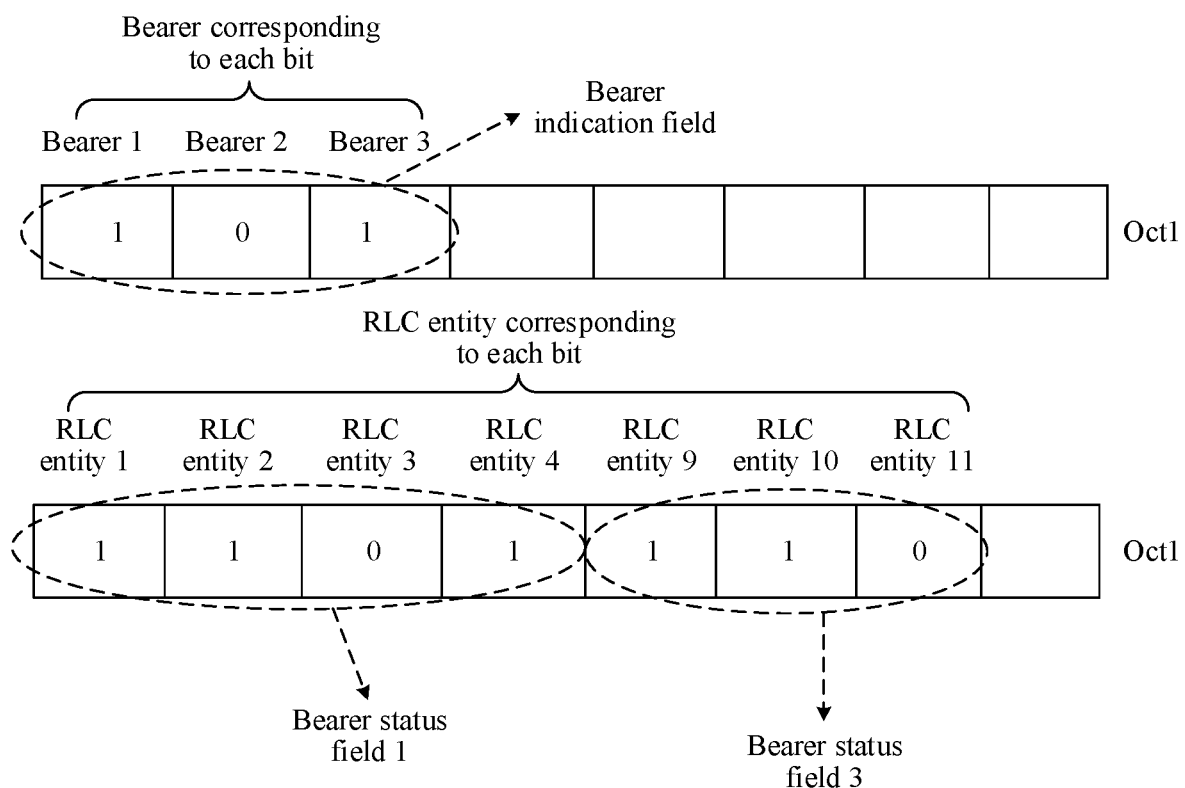

For example, as shown in FIG. 15, a bearer 1 to a bearer 3 each correspond to one bit in the bearer indication field. The bearer 1 corresponds to the first bit in the bearer indication field, the bearer 2 corresponds to the second bit in the bearer indication field, and the bearer 3 corresponds to the third bit in the bearer indication field. If a bit corresponding to a bearer is 1, it indicates that the first instruction includes a bearer status field corresponding to the bearer. If a bit corresponding to a bearer is 0, it indicates that the first instruction does not include a bearer status field corresponding to the bearer. As shown in FIG. 15, the bits corresponding to the bearer 1 and the bearer 3 are 1, and the bit corresponding to the bearer 2 is 0. Therefore, the first instruction includes a bearer status field 1 corresponding to the bearer 1. The first instruction includes a bearer status field 3 corresponding to the bearer 3. The first instruction does not include a bearer status field 2 corresponding to the bearer 2.

Figure 16:
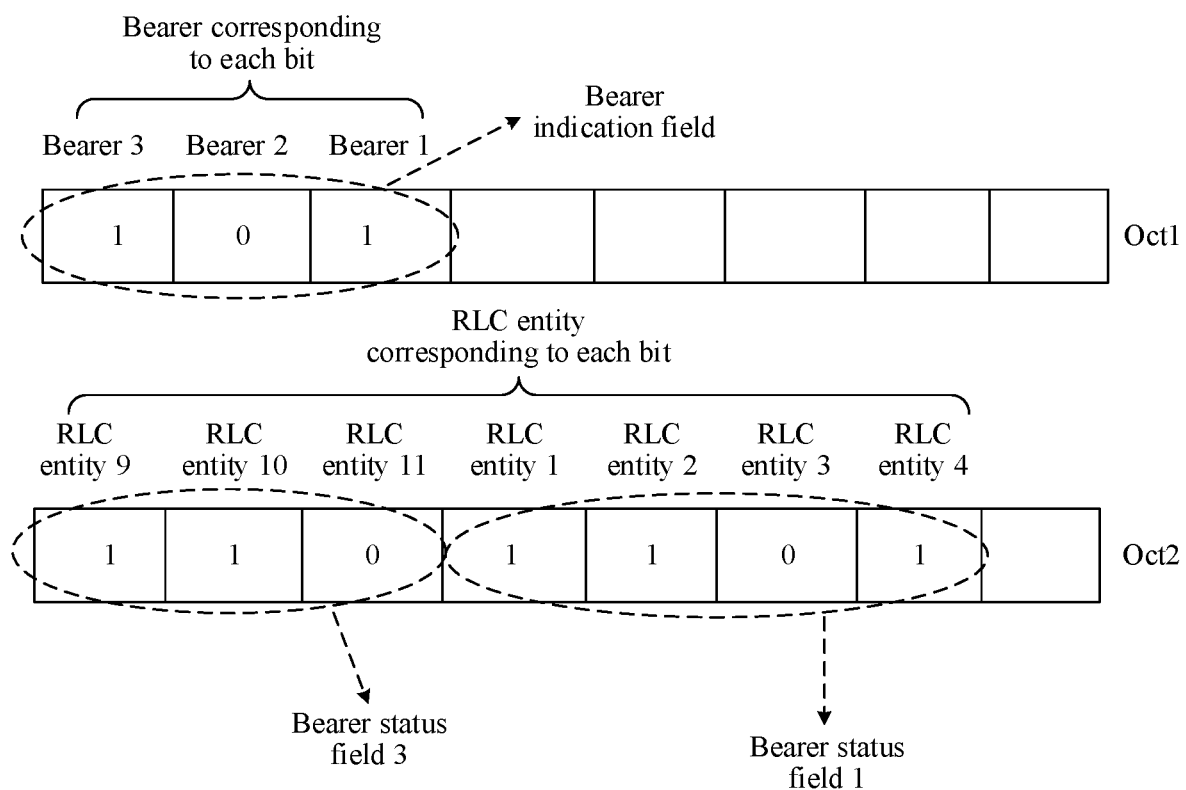

Optionally, the bits in the bearer indication field are sorted in ascending order of values of bearer identifiers, or are sorted in descending order of values of bearer identifiers. For example, identifiers of the bearer 1 to the bearer 3 are in descending order. If the bits in the bearer indication field are sorted in ascending order of the values of the bearer identifiers, as shown in FIG. 15, the bit corresponding to the bearer 1, the bit corresponding to the bearer 2, and the bit corresponding to the bearer 3 are sorted in sequence in the bearer indication field. If the bits in the bearer indication field are sorted in descending order of the values of the bearer identifiers, as shown in FIG. 16, the bit corresponding to the bearer 3, the bit corresponding to the bearer 2, and the bit corresponding to the bearer 1 are sorted in sequence in the bearer indication field.

Figure 17:
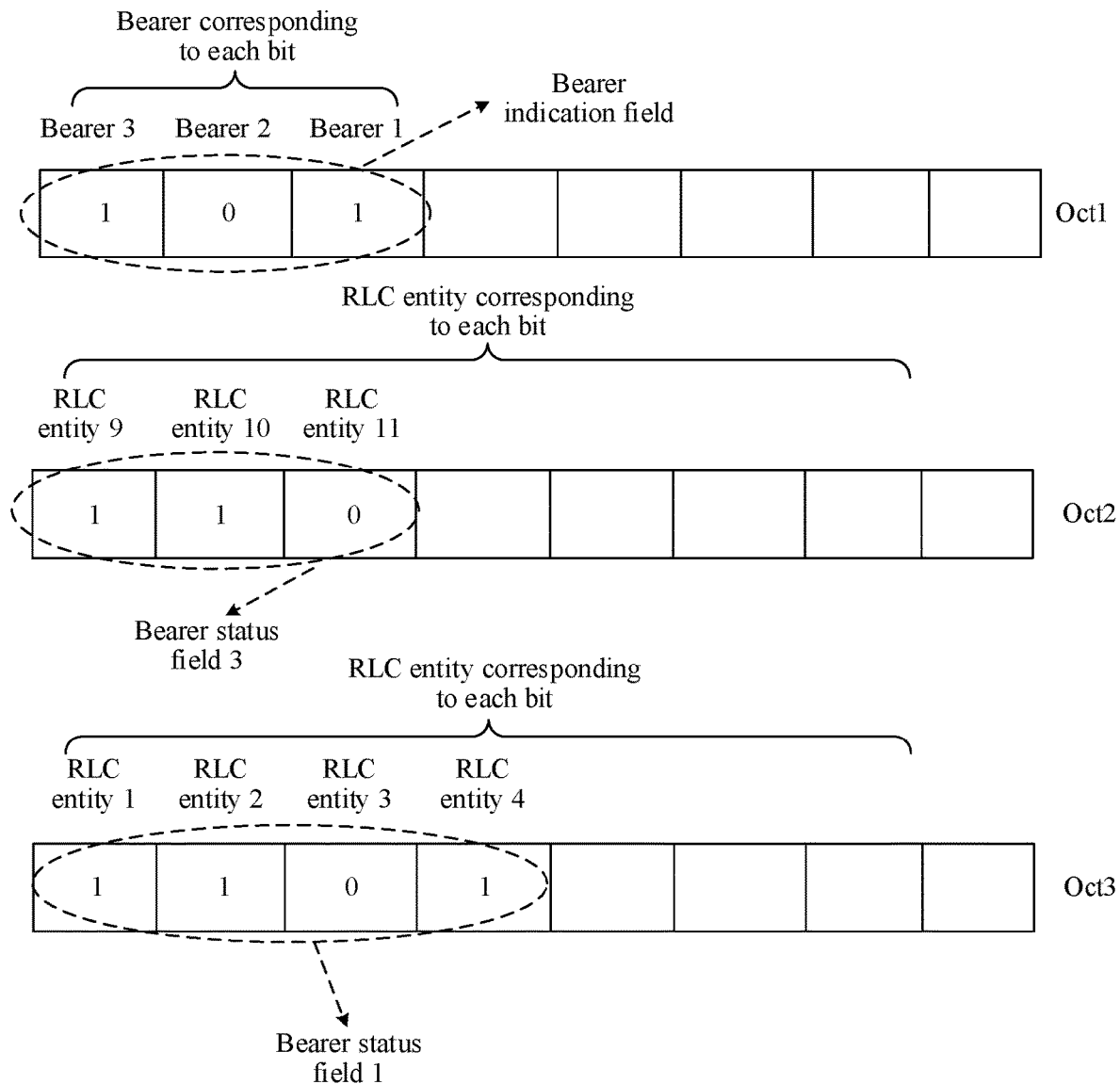

Optionally, as shown in FIG. 17, one octet includes only one bearer status field, so that the first instruction has an aligned structure.

Figure 18:
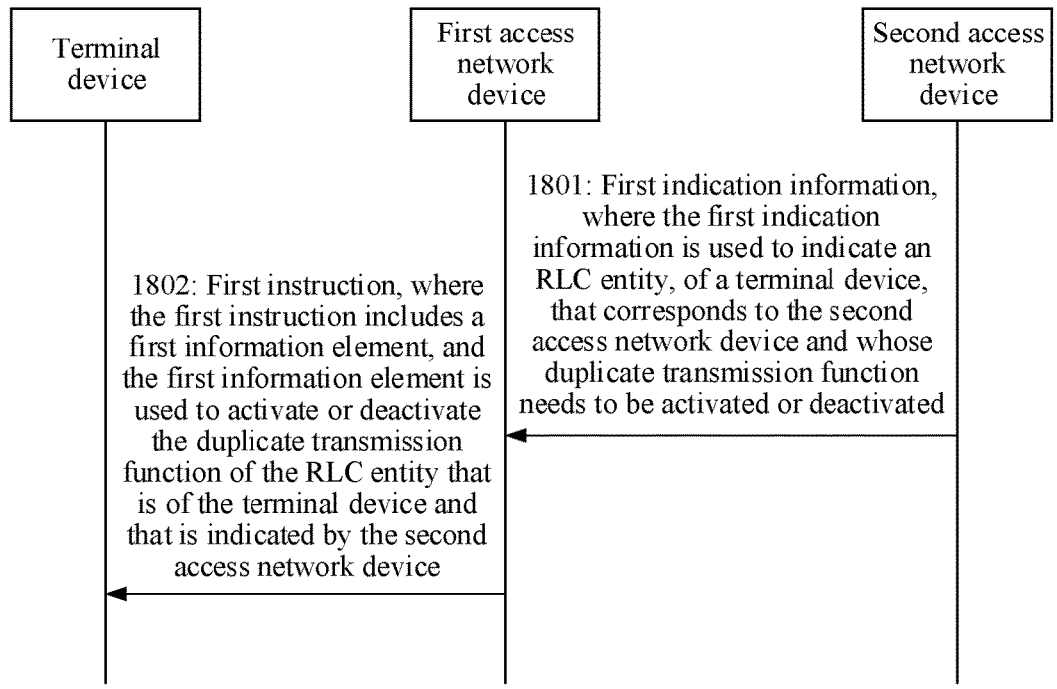
FIG. 18 is a schematic flowchart of still another communication method according to an embodiment of this application.

FIG. 18 is a schematic diagram of another communication method according to an embodiment of this application. As shown in FIG. 18, the communication method includes the following steps 1801 to 1806.

1801: A second access network device sends first indication information to a first access network device.

The first indication information is used to indicate an RLC entity, of a terminal device, that corresponds to the second access network device and whose duplicate transmission function needs to be activated or deactivated. In this embodiment and the following embodiment, that a duplicate transmission function needs to be activated or deactivated means that the duplicate transmission function is to be activated or deactivated.

1802: The first access network device sends a first instruction to the terminal device.

In this embodiment of this application, after receiving the first indication information, the first access network device sends the first instruction to the terminal device. The first instruction includes a first information element, and the first information element is used to activate or deactivate the duplicate transmission function of the RLC entity that is of the terminal device and that is indicated by the second access network device. In other words, the first information element is used to activate or deactivate the duplicate transmission function of the RLC entity indicated by the first indication information.

When the second access network device is a master access network device, the first access network device is a secondary access network device. When the second access network device is a secondary access network device, the first access network device is a master access network device.

For example, the terminal device includes an RLC entity 1 to an RLC entity 4. The master access network device includes an RLC entity 5 and an RLC entity 6. A secondary access network device 1 includes an RLC entity 7 and an RLC entity 8. The RLC entity 1 and the RLC entity 2 are configured to send a duplicated data packet to the master access network device. The RLC entity 3 and the RLC entity 4 are configured to send a duplicated data packet to the secondary access network device 1. If the second access network device is the secondary access network device 1, and the first access network device is the master access network device, the secondary access network device 1 sends the first indication information to the master access network device. The first indication information indicates that duplicate transmission functions of the RLC entity 3 and the RLC entity 4 need to be activated. After receiving the first indication information, the master access network device may send the first instruction to the terminal device, where the first information element in the first instruction is used to activate the duplicate transmission functions of the RLC entity 3 and the RLC entity 4. The first instruction may be a MAC CE. Similarly, if the second access network device is the master access network device, and the first access network device is the secondary access network device 1, the master access network device sends the first indication information to the secondary access network device 1. The first indication information indicates that duplicate transmission functions of the RLC entity 1 and the RLC entity 2 need to be activated. After receiving the first indication information, the secondary access network device 1 may send the first instruction to the terminal device, where the first information element in the first instruction is used to activate the duplicate transmission functions of the RLC entity 1 and the RLC entity 2.

Figure 19:
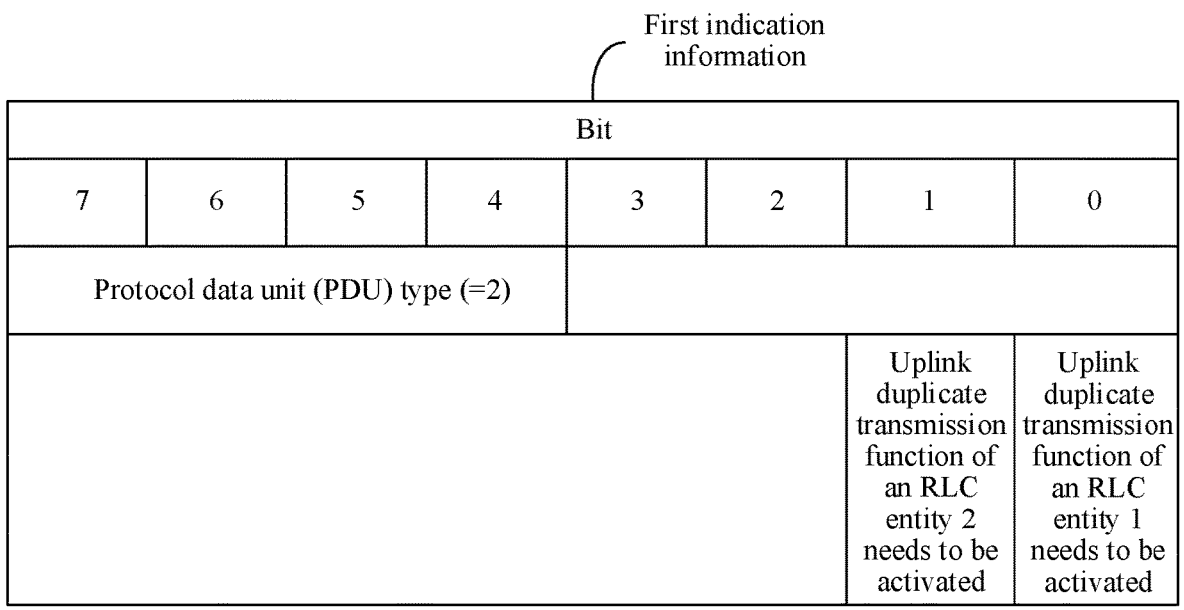

Optionally, if the first indication information is sent by the master access network device to the secondary access network device 1, a structure of the first indication information may be shown in FIG. 19. Optionally, if the first indication information is sent by the secondary access network device 1 to the master access network device, a structure of the first indication information may be shown in FIG. 20. Optionally, the RLC entity of the terminal device may correspond to a bit at a fixed location in the first indication information, and the bit is used to indicate whether a duplicate transmission function of corresponding RLC entity needs to be activated or deactivated. For example, in FIG. 19, a bit numbered 0 in the second byte corresponds to the RLC entity 1 of the terminal device, and a bit numbered 1 corresponds to the RLC entity 2 of the terminal device. If a value of the bit numbered 0 in the second byte is 1, it indicates that the duplicate transmission function of the RLC entity 1 of the terminal device needs to be activated. If the value of the bit numbered 0 in the second byte is 0, it indicates that the duplicate transmission function of the RLC entity 1 of the terminal device needs to be deactivated. If a value of the bit numbered 1 in the second byte is 1, it indicates that the duplicate transmission function of the RLC entity 2 of the terminal device needs to be activated. If the value of the bit numbered 1 in the second byte is 0, it indicates that the duplicate transmission function of the RLC entity 2 of the terminal device needs to be deactivated. A case in FIG. 20 is similar to the case herein, and details are not described herein again. Optionally, the RLC entity of the terminal device may alternatively not correspond to a bit at a fixed location in the first indication information. Instead, one RLC entity of the terminal device corresponds to one byte, and a value of the byte is used to indicate whether the corresponding RLC entity needs to be activated or deactivated.

Figure 21:

Optionally, the secondary access network device may further indicate, to the master access network device, an RLC entity that is of the secondary access network device and whose downlink duplicate transmission function needs to be activated or deactivated. The secondary access network device may indicate, by using the first indication information, the RLC entity that is of the secondary access network device and whose downlink duplicate transmission function needs to be activated or deactivated. To be specific, by using the first indication information, the secondary access network device indicates the RLC entity, of the terminal device, that corresponds to the secondary access network device and whose duplicate transmission function needs to be activated or deactivated, and indicates the RLC entity that is of the secondary access network device and whose downlink duplicate transmission function needs to be activated or deactivated. For example, a structure of the first indication information may be shown in FIG. 21. Optionally, the first indication information may further include a bit 1 and a bit 2. The bit 1 is used to indicate whether there is a bit used to indicate the RLC entity, of the terminal device, that corresponds to the second access network device and whose duplicate transmission function needs to be activated or deactivated. The bit 2 is used to indicate whether there is a bit used to indicate the RLC entity that is of the secondary access network device and whose downlink duplicate transmission function needs to be activated or deactivated. Alternatively, the first indication information includes only one bit, and the bit indicates whether there is a bit used to indicate the RLC entity, of the terminal device, that corresponds to the second access network device and whose duplicate transmission function needs to be activated or deactivated, and further indicates whether there is a bit used to indicate the RLC entity that is of the secondary access network device and whose downlink duplicate transmission function needs to be activated or deactivated. An example in which the first indication information includes the bit 1 and the bit 2 is used in FIG. 21.

Certainly, the secondary access network device may separately indicate, by using two pieces of indication information, the RLC entity, of the terminal device, that corresponds to the secondary access network device and whose duplicate transmission function needs to be activated or deactivated and the RLC entity that is of the secondary access network device and whose downlink duplicate transmission function needs to be activated or deactivated. For example, the secondary access network device may indicate, by using the first indication information, the RLC entity, of the terminal device, that corresponds to the secondary access network device and whose duplicate transmission function needs to be activated or deactivated; and indicate, by using third indication information, the RLC entity that is of the secondary access network device and whose downlink duplicate transmission function needs to be activated or deactivated.

By performing the method described in FIG. 18, the first access network device can learn of the RLC entity, of the terminal device, that corresponds to the second access network device and whose duplicate transmission function needs to be activated or deactivated, so that the instruction that is sent by the first access network device and that is used to activate or deactivate the duplicate transmission function of the RLC entity that is of the terminal device and that corresponds to the second access network device can be consistent with an instruction that is sent by the second access network device and that is used to activate or deactivate the duplicate transmission function of the RLC entity that is of the terminal device and that corresponds to the second access network device.

Figure 22:
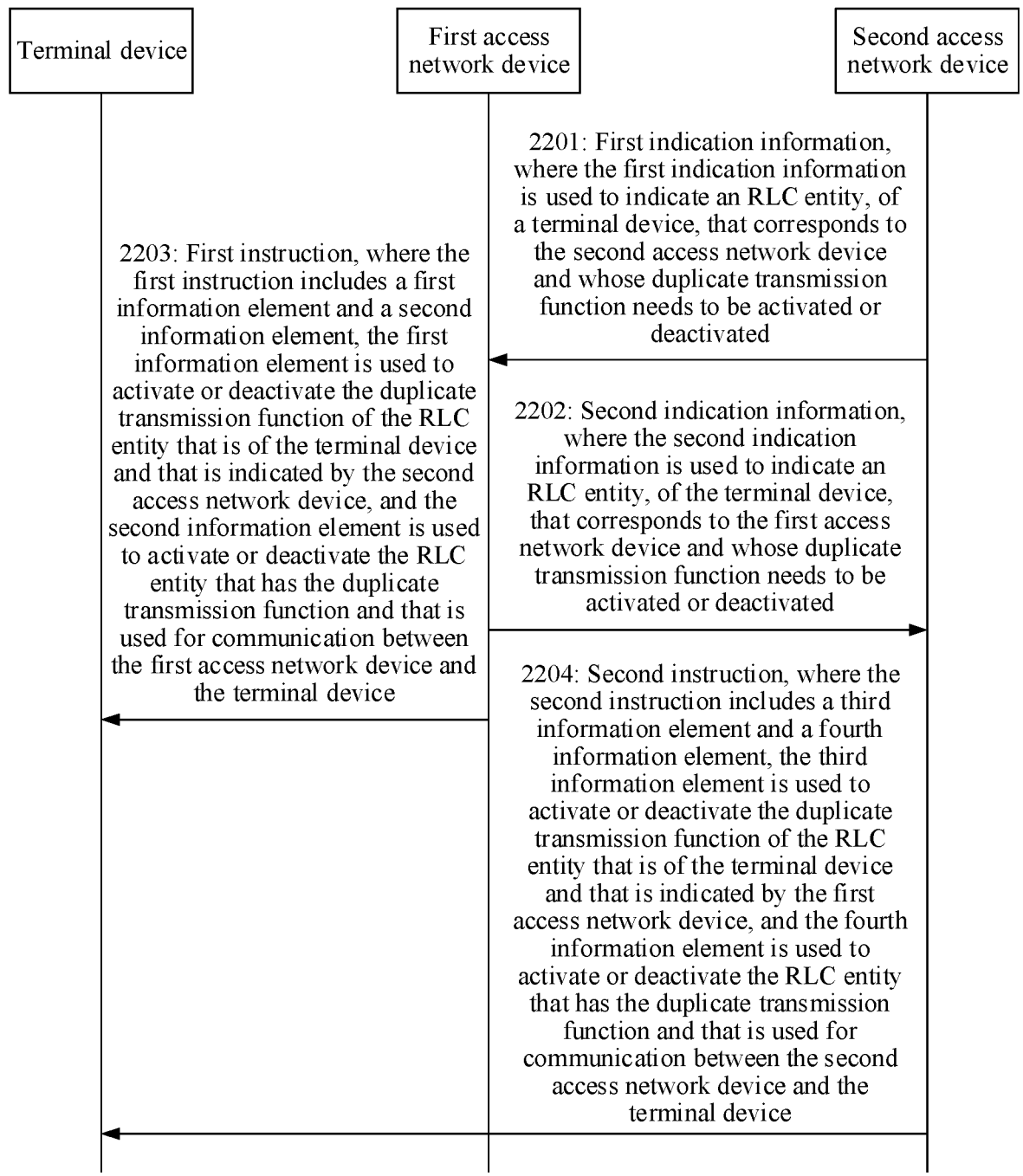
FIG. 22, FIG. 23 and FIG. 24 are schematic flowcharts of communication methods according to embodiments of this application.

FIG. 22 is a schematic diagram of another communication method according to an embodiment of this application. As shown in FIG. 22, the communication method includes the following steps 2201 to 2204.

2201: A second access network device sends first indication information to a first access network device.

The first indication information is used to indicate an RLC entity, of a terminal device, that corresponds to the second access network device and whose duplicate transmission function needs to be activated or deactivated. When the second access network device is a master access network device, the first access network device is a secondary access network device. When the second access network device is a secondary access network device, the first access network device is a master access network device.

2202: The first access network device sends second indication information to the second access network device.

The second indication information is used to indicate an RLC entity, of the terminal device, that corresponds to the first access network device and whose duplicate transmission function needs to be activated or deactivated.

2203: The first access network device sends a first instruction to the terminal device.

In this embodiment of this application, after receiving the first indication information, the first access network device sends the first instruction to the terminal device. Step 2203 is performed after steps 2201 and 2202. The first instruction includes a first information element and a second information element. The first information element is used to activate or deactivate the duplicate transmission function of the RLC entity that is of the terminal device and that is indicated by the second access network device. The second information element is used to activate or deactivate the RLC entity that has the duplicate transmission function and that is used for communication between the first access network device and the terminal device.

2204: The second access network device sends a second instruction to the terminal device.

In this embodiment of this application, after receiving the second indication information, the second access network device sends the second instruction to the terminal device. Step 2204 is performed after steps 2201 and 2202. The second instruction includes a third information element and a fourth information element. The third information element is used to activate or deactivate the duplicate transmission function of the RLC entity that is of the terminal device and that is indicated by the first access network device. The fourth information element is used to activate or deactivate the RLC entity that has the duplicate transmission function and that is used for communication between the second access network device and the terminal device.

An example in which the first access network device is a master access network device and the second access network device is a secondary access network device 1 is used. For example, the terminal device includes an RLC entity 1 to an RLC entity 4. The master access network device includes an RLC entity 5 and an RLC entity 6. The secondary access network device 1 includes an RLC entity 7 and an RLC entity 8. The RLC entity 1 and the RLC entity 2 are configured to send a duplicated data packet to the master access network device. The RLC entity 3 and the RLC entity 4 are configured to send a duplicated data packet to the secondary access network device 1. The secondary access network device 1 sends the first indication information to the master access network device. The first indication information indicates that duplicate transmission functions of the RLC entity 3 and the RLC entity 4 need to be activated. The master access network device sends the second indication information to the secondary access network device 1. The second indication information indicates that duplicate transmission functions of the RLC entity 1 and the RLC entity 2 need to be activated. After receiving the first indication information, the master access network device may send the first instruction to the terminal device, where the first information element in the first instruction is used to activate the duplicate transmission functions of the RLC entity 3 and the RLC entity 4, and the second information element is used to activate the duplicate transmission functions of the RLC entity 1 and the RLC entity 2. After receiving the second indication information, the secondary access network device 1 may send the second instruction to the terminal device, where the third information element in the second instruction is used to activate the duplicate transmission functions of the RLC entity 1 and the RLC entity 2, and the fourth information element is used to activate the duplicate transmission functions of the RLC entity 3 and the RLC entity 4.

The procedures described in FIG. 18 and FIG. 22 are procedures in which the master access network device and the secondary access network device agree upon an RLC entity that is of the terminal device and whose uplink duplicate transmission function needs to be activated or deactivated. The procedures may alternatively be combined with a solution described in another embodiment of this specification.

Figure 23:
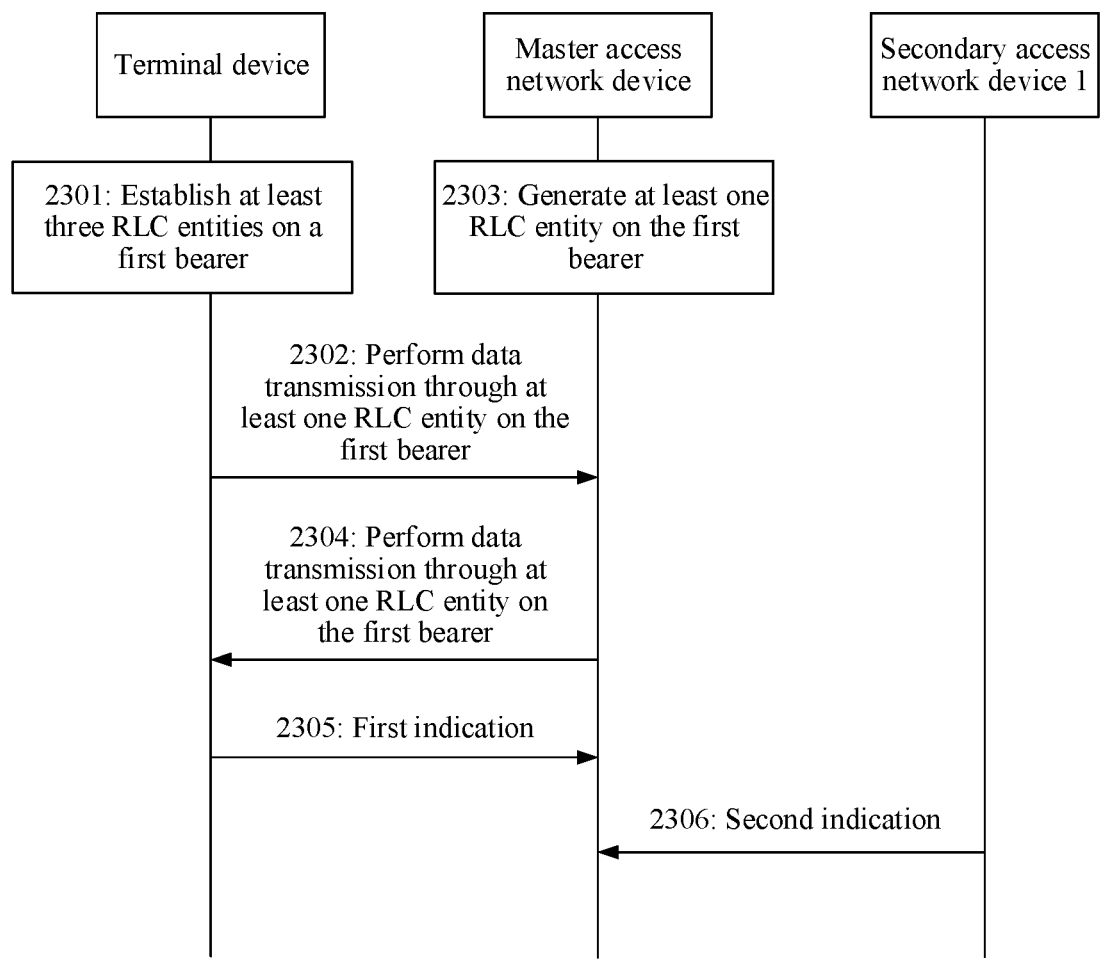

FIG. 23 is a schematic diagram of another communication method according to an embodiment of this application. As shown in FIG. 23, the communication method includes the following steps 2301 to 2306.

2301: A terminal device establishes at least three RLC entities on a first bearer.

2302: The terminal device performs data transmission through at least one RLC entity on the first bearer.

2303: A master access network device generates at least one RLC entity on the first bearer.

2304: The master access network device performs data transmission through at least one RLC entity on the first bearer.

For specific implementations of step 2301 to step 2304, refer to the descriptions corresponding to step 601 to step 604 in FIG. 6, and details are not described herein again.

2305: The terminal device sends a first indication to the master access network device.

Alternatively, the terminal device may send the first indication to another access network device. An example in which the terminal device sends the first indication to the master access network device is used in FIG. 23.

The first indication is used to indicate a quantity of bits of an unsent duplicated data packet in an RLC entity that is of the terminal device and whose duplicate transmission function is activated. After receiving the first indication, the master access network device may allocate a communication resource to the terminal device. For example, if the quantity of bits of the unsent duplicated data packet in the RLC entity that is of the terminal device and whose duplicate transmission function is activated is relatively large, a resource in a cell corresponding to the RLC entity is preferentially allocated to the terminal device. Alternatively, after receiving the first indication, the master access network device may not allocate a communication resource to the terminal device. A case that occurs after the another access network device receives the first indication is similar to the case herein, and details are not described herein again. Implementation of step 2305 helps allocate the resource to the terminal device in time.

2306: A secondary access network device sends a second indication to the master access network device.

The second indication is used to indicate a quantity of bits of an unsent duplicated data packet in an RLC entity that is of the secondary access network device and whose duplicate transmission function is activated. An example in which the secondary access network device is a secondary access network device 1 is used in FIG. 23.

After receiving the second indication, the master access network device may determine, in the RLC entity that is of the secondary access network device and whose duplicate transmission function is activated, an RLC entity used for duplicate transmission. Optionally, the master access network device may determine, in the RLC entity that is of the secondary access network device and whose duplicate transmission function is activated, an RLC entity in which a quantity of bits of an unsent duplicated data packet is less than a preset quantity of bits, to perform duplicate transmission.

For example, the RLC entities that are of the secondary access network device and whose duplicate transmission functions are activated include an RLC entity 1 to an RLC entity 3. A quantity of bits of an unsent duplicated data packet in the RLC entity 1 is 1000, a quantity of bits of an unsent duplicated data packet in the RLC entity 2 is 100, and a quantity of bits of an unsent duplicated data packet in the RLC entity 3 is 50. The preset quantity of bits is 200. Because the quantity of bits of the unsent duplicated data packet in the RLC entity 1 is greater than the preset quantity of bits, the master access network device does not deliver, to the RLC entity 1 of the secondary access network device through a PDCP entity, a data packet on which duplicate transmission is to be performed. Because the quantity of bits of the unsent duplicated data packet in each of the RLC entity 2 and the RLC entity 3 is less than the preset quantity of bits, the master access network device delivers, to the RLC entity 2 and the RLC entity 3 of the secondary access network device through the PDCP entity, the data packet on which duplicate transmission is to be performed.

Alternatively, the master access network device may combine the quantity of bits of the unsent duplicated data packet in the RLC entity with radio air interface quality of the RLC entity, to determine, in the RLC entity that is of the secondary access network device and whose duplicate transmission function is activated, the RLC entity used for duplicate transmission. For a specific implementation principle of this manner, refer to the descriptions corresponding to step 604 in FIG. 6. Details are not described herein again.

By performing step 2306, the master access network device may select, from the RLC entity that is of the secondary access network device and whose duplicate transmission function is activated, an RLC entity whose unsent duplicated data packet has a relatively small quantity of bits, to perform duplicate transmission. This helps reduce a data transmission latency.

Figure 24:
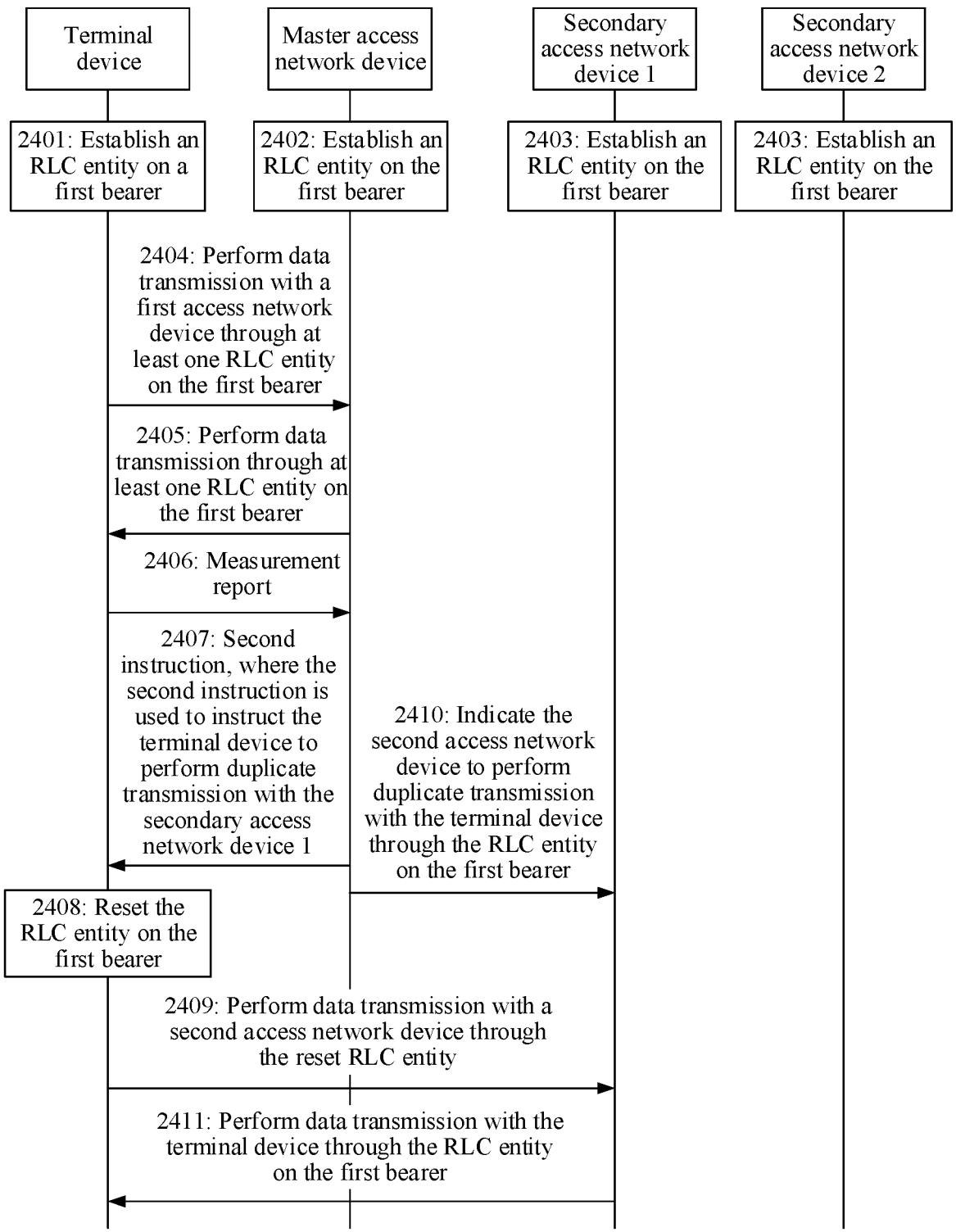

FIG. 24 is a schematic diagram of another communication method according to an embodiment of this application. As shown in FIG. 24, the communication method includes the following steps 2401 to 2411.

2401: A terminal device establishes an RLC entity on a first bearer.

2402: A master access network device establishes an RLC entity on the first bearer.

2403: A secondary access network device establishes an RLC entity on the first bearer.

Optionally, the first bearer includes at least three RLC entities of the terminal device, and includes at least three RLC entities on an access network device side in total. In other words, the terminal device establishes the at least three RLC entities on the first bearer. The access network device side establishes the at least three RLC entities on the first bearer in total. There may be one or more secondary access network devices, and an example in which the secondary access network devices include a secondary access network device 1 and a secondary access network device 2 is used in FIG. 24. For example, the first bearer includes three RLC entities of the terminal device, includes two RLC entities of the master access network device, includes two RLC entities of the secondary access network device 1, and includes two RLC entities of the secondary access network device 2. In other words, the terminal device generates three RLC entities on the first bearer, the master access network device generates two RLC entities on the first bearer, the secondary access network device 1 generates two RLC entities on the first bearer, and the secondary access network device 2 generates two RLC entities on the first bearer.

Optionally, the first bearer may alternatively include only two RLC entities of the terminal device, and include at least three RLC entities on the access network device side in total.

Optionally, the first bearer may alternatively include only one RLC entity of the terminal device, and include at least two RLC entities on the access network device side in total. The terminal device generates one RLC entity, and the access network device side may generate a plurality of RLC entities in total.

Optionally, a quantity of RLC entities on the access network device side and on the first bearer may be greater than a quantity of RLC entities of the terminal device on the first bearer. For example, the first bearer includes three RLC entities of the terminal device, includes two RLC entities of the master access network device, includes two RLC entities of the secondary access network device 1, and includes two RLC entities of the secondary access network device 2.

2404: The terminal device performs data transmission with a first access network device through at least one RLC entity on the first bearer.

The first access network device may be the master access network device, the secondary access network device 1, or the secondary access network device 2. An example in which the first access network device is the master access network device is used in FIG. 24. The terminal device may perform data transmission with the first access network device through a part of RLC entities or all the RLC entities on the first bearer.

2405: The first access network device performs data transmission through at least one RLC entity on the first bearer.

Specifically, the first access network device performs data transmission with the terminal device through the at least one RLC entity on the first bearer.

2406: In a process in which the terminal device performs duplicate transmission with the first access network device, when detecting that a wireless communication indicator meets a preset condition, the terminal device reports, to the master access network device, a measurement report used to indicate that the wireless communication indicator meets the preset condition.

The wireless communication indicator may be signal quality or signal strength.

For example, if signal quality of a cell or a subband in which the first access network device is located is less than a first preset quality threshold, the terminal device reports, to the master access network device, a measurement report used to indicate that signal quality information of the cell or the subband in which the first access network device is located is less than the first preset quality threshold. Optionally, the measurement report further includes an identifier of an access network device located in a cell or a subband whose signal quality is greater than the first preset quality threshold.

For another example, if signal quality of a cell or a subband in which a second access network device is located is greater than signal quality of a cell or a subband in which the first access network device is located, the terminal device reports, to the master access network device, a measurement report used to indicate that the signal quality of the cell or the subband in which the second access network device is located is greater than the signal quality of the cell or the subband in which the first access network device is located. Optionally, the measurement report further includes an identifier of the second access network device. The second access network device is an access network device other than the first access network device. An example in which the second access network device is the secondary access network device 1 is used in FIG. 24.

For another example, if signal quality of a cell or a subband in which a second access network device is located is greater than signal quality of a cell or a subband in which the terminal device is located and exceeds a second preset quality threshold, the terminal device reports, to the master access network device, a measurement report used to indicate that the signal quality of the cell or the subband in which the second access network device is located is greater than the signal quality of the cell or the subband in which the first access network device is located and exceeds the second preset quality threshold. Optionally, the measurement report further includes an identifier of the second access network device.

2407: The master access network device sends a second instruction to the terminal device.

In this embodiment of this application, after receiving the measurement report, the master access network device determines the second access network device. After determining the second access network device, the master access network device sends the second instruction to the terminal device, where the second instruction is used to instruct the terminal device to perform data transmission with the second access network device. The second access network device is an access network device other than the first access network device. Alternatively, the master access network device may not establish the RLC entity on the first bearer, and only the secondary access network device establishes the RLC entity on the first bearer. An example in which the master access network device also establishes the RLC entity on the first bearer is used in FIG. 24. If the master access network device does not establish the RLC entity on the first bearer, both the second access network device and the first access network device are secondary access network devices.

Optionally, the second access network device may be an access network device located in a cell or a subband whose signal quality is greater than the first preset quality threshold, or the second access network device may be an access network device located in a cell or a subband whose signal quality is greater than the signal quality of the cell or the subband in which the first access network device is located and exceeds the second preset quality threshold.

If the measurement report carries the identifier of the second access network device, the second access network device may be directly determined based on the measurement report. If the measurement report does not carry the identifier of the second access network device, the second access network device may be determined in another manner.

Step 2406 and step 2407 are optional steps.

2408: The terminal device resets the RLC entity on the first bearer.

In this embodiment of this application, after receiving the second instruction, the terminal device resets the RLC entity on the first bearer, and then performs data transmission with the second access network device through the reset RLC entity. Specifically, the terminal device resets the RLC entity that is on the first bearer and that is used for data transmission with the first access network device.

For example, the first bearer includes an RLC entity 1 of the terminal device, includes an RLC entity 2 of the master access network device, includes an RLC entity 2 of the secondary access network device 1, and includes an RLC entity 3 of the secondary access network device 2. An example in which the first access network device is the master access network device and the second access network device is the secondary access network device 1 is used. The RLC entity 1 of the terminal device performs data transmission with the RLC entity 2 of the master access network device. When detecting that signal quality of a cell or a subband in which the secondary access network device 1 is located is greater than that of a cell or a subband in which the master access network device is located, the terminal device uploads the measurement report to the master access network device. After receiving the measurement report, the master access network device determines that the secondary access network device 2 needs to perform data transmission with the terminal device. Therefore, the master access network device sends the second instruction to the terminal device, where the second instruction is used to instruct the terminal device to perform data transmission with the secondary access network device 2. After receiving the second instruction, the terminal device resets the RLC entity 1, and performs data transmission with the RLC entity 2 of the secondary access network device 1 through the RLC entity 1. The master access network device indicates the secondary access network device 1 to perform data transmission with the terminal device through the RLC entity 2.

For example, the first bearer includes an RLC entity 1 to an RLC entity 3 of the terminal device, includes an RLC entity 4 to an RLC entity 6 of the master access network device, includes an RLC entity 7 to an RLC entity 9 of the secondary access network device 1, and includes an RLC entity 10 to an RLC entity 12 of the secondary access network device 2. An example in which the first access network device is the master access network device and the second access network device is the secondary access network device 1 is used. The RLC entity 1 and the RLC entity 2 of the terminal device perform data transmission with the RLC entity 4 and the RLC entity 5 of the master access network device, and the RLC entity 3 of the terminal device performs data transmission with the RLC entity 10 of the secondary access network device 2. When detecting that signal quality of a cell or a subband in which the secondary access network device 1 is located is greater than that of a cell or a subband in which the master access network device is located, the terminal device uploads the measurement report to the master access network device. After receiving the measurement report, the master access network device determines that the secondary access network device 2 needs to perform data transmission with the terminal device. Therefore, the master access network device sends the second instruction to the terminal device, where the second instruction is used to instruct the terminal device to perform data transmission with the secondary access network device 2. After receiving the second instruction, the terminal device resets the RLC entity 1 and the RLC entity 2, performs data transmission with the RLC entity 4 and the RLC entity 5 of the secondary access network device 1 through the RLC entity 1 and the RLC entity 2, and continues to perform data transmission with the RLC entity 10 of the secondary access network device 2 through the RLC entity 3. The master access network device indicates the secondary access network device 1 to perform data transmission with the terminal device through the RLC entity 4 and the RLC entity 5.

2409: The terminal device performs data transmission with the second access network device through the reset RLC entity.

2410: The master access network device indicates the second access network device to perform duplicate transmission with the terminal device through the RLC entity on the first bearer.

2411: The second access network device performs data transmission with the terminal device through the RLC entity on the first bearer.

It can be learned that, by performing the method described in FIG. 24, the terminal device may be handed over to an access network device among a plurality of access network devices for data transmission.

The foregoing describes the communication method according to the embodiments of this application in detail, and the following describes related devices according to the embodiments of this application.

In the embodiments of the present invention, the device may be divided into function modules based on the foregoing method examples. For example, each function module may be obtained through division based on each corresponding function, or two or more functions may be integrated into one module. The integrated module may be implemented in a form of hardware, or may be implemented in a form of a software function module. It should be noted that, in the embodiments of the present invention, the division into the modules is an example, and is merely division into logical functions. In an actual implementation, another division manner may be used.

Figure 25:
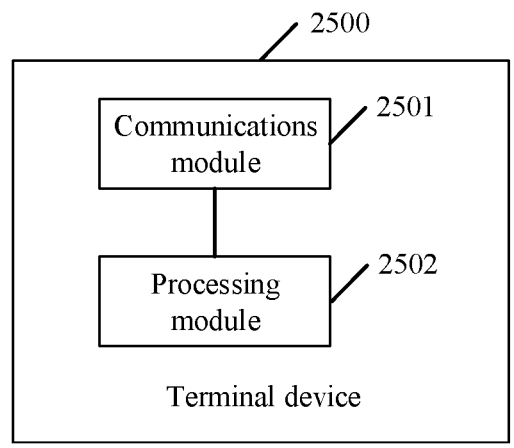
FIG. 25 is a schematic structural diagram of a terminal device according to an embodiment of this application.

In an example, FIG. 25 is a schematic block diagram of a terminal device 2500 according to an embodiment of this application. The terminal device 2500 in this embodiment of this application may be the terminal device in the foregoing method embodiments, or may be one or more chips in the terminal device. The terminal device 2500 may be configured to perform some or all functions of the terminal device in the foregoing method embodiments. The terminal device 2500 may include a communications module 2501 and a processing module 2502.

The communications module 2501 is configured to receive a configuration message, where the configuration message is used to indicate the terminal device to establish at least three radio link control RLC entities on a first bearer. The processing module 2502 is configured to establish the at least three RLC entities on the first bearer based on the configuration message. The communications module 2501 is further configured to perform data transmission through at least one RLC entity on the first bearer.

Optionally, the terminal device further includes a generation module, configured to generate a first data packet. The communications module is configured to perform duplicate transmission on the first data packet through at least two RLC entities on the first bearer.

Optionally, the terminal device further includes an indication module, configured to indicate, to an RLC entity in the at least two RLC entities, that the first data packet is a duplicated data packet.

Optionally, the terminal device further includes a notification module, configured to: when it is detected that a preset quantity of RLC entities on the first bearer have sent the first data packet, notify an RLC entity that has not sent the first data packet to delete the first data packet.

Optionally, a transport block in which the first data packet is located does not include a data packet other than the first data packet.

Optionally, the communications module 2501 is further configured to receive a second data packet, where a transport block in which the second data packet is located does not include a data packet other than the second data packet. The processing module 2502 is configured to combine the second data packet with a duplicated data packet that is of the second data packet and that is stored in the terminal device.

Optionally, the configuration message includes identifiers of the to-be-configured RLC entities or logical channel identifiers.

Optionally, the communications module 2501 is further configured to receive a first instruction from an access network device, where the first instruction includes a bearer status field, the bearer status field includes at least one bit, the bearer status field corresponds to a bearer configured with a duplicate transmission function, each bit in the bearer status field corresponds to one RLC entity on the bearer, and the bit is used to indicate to activate or deactivate a duplicate transmission function of the corresponding RLC entity.

Optionally, the first instruction further includes a bearer indication field, the bearer indication field includes at least one bit, and each bit corresponds to one bearer configured with a duplicate transmission function, and is used to indicate whether the first instruction includes a bearer status field corresponding to the bearer.

Optionally, the communications module 2501 is further configured to send a first indication to the access network device, where the first indication is used to indicate a quantity of bits of an unsent duplicated data packet in an RLC entity that is of the terminal device and whose duplicate transmission function is activated.

Optionally, the communications module 2501 is configured to perform data transmission with a first access network device through the at least one RLC entity on the first bearer. The communications module 2501 is further configured to receive a second instruction sent by a master access network device, where the second instruction is used to instruct the terminal device to perform data transmission with a second access network device. The processing module 2502 is further configured to reset the RLC entities on the first bearer. The communications module 2501 is further configured to perform data transmission with the second access network device through the reset RLC entities.

Optionally, each RLC entity on the first bearer corresponds to one subband or one subband set, and at least two RLC entities of the terminal device on the first bearer correspond to different subbands or different subband sets.

Figure 26:
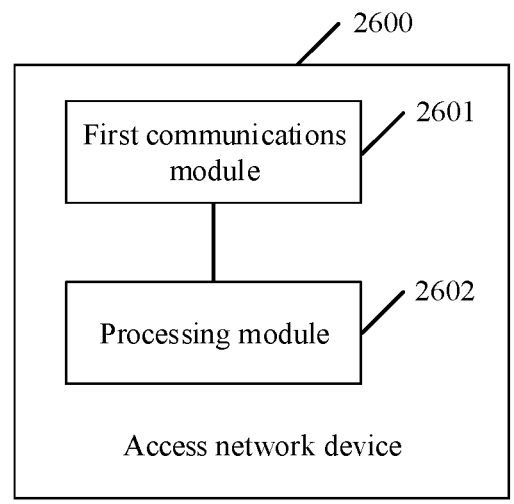
FIG. 26 is a schematic structural diagram of an access network device according to an embodiment of this application.
Figure 27:
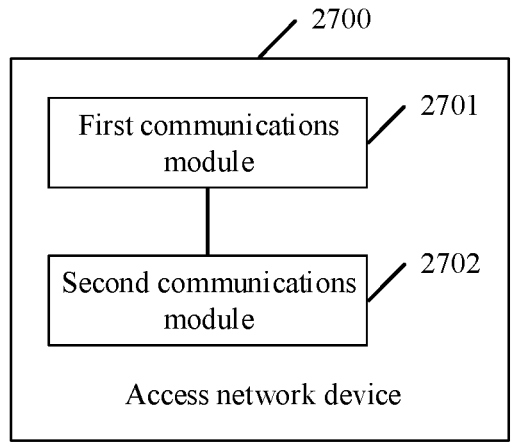
FIG. 27 is a schematic structural diagram of another access network device according to an embodiment of this application.

In an example, FIG. 26 is a schematic block diagram of an access network device 2600 according to an embodiment of this application. The access network device 2600 in this embodiment of this application may be the access network device in the foregoing method embodiments, or may be one or more chips in the access network device. The access network device 2600 may be configured to perform some or all functions of the access network device in the foregoing method embodiments. The access network device 2600 may include a first communications module 2601 and a processing module 2602.

The processing module 2602 is configured to establish at least one RLC entity on a first bearer, where the first bearer includes at least three RLC entities of a terminal device, and includes at least three RLC entities of one or more access network devices in total. The first communications module 2601 is configured to perform data transmission through at least one RLC entity on the first bearer.

In an optional implementation, a manner in which the first communications module 2601 performs data transmission through the at least one RLC entity on the first bearer is specifically: receiving a second data packet; and performing duplicate transmission on the second data packet through the at least one RLC entity on the first bearer.

In an optional implementation, the access network device further includes an indication module, configured to indicate, to an RLC entity in the at least one RLC entity, that the second data packet is a duplicated data packet.

In an optional implementation, the access network device further includes a notification module, configured to: when it is detected that a preset quantity of RLC entities on the first bearer have sent the second data packet, notify an RLC entity that has not sent the second data packet to delete the second data packet.

In an optional implementation, a transport block in which the second data packet is located does not include a data packet other than the second data packet.

In an optional implementation, the first communications module 2601 is further configured to receive a first data packet, where a transport block in which the first data packet is located does not include a data packet other than the first data packet. The processing module 2602 is further configured to combine the first data packet with a duplicated data packet that is of the first data packet and that is stored in the access network device.

In an optional implementation, the first communications module 2601 is further configured to send a configuration message to the terminal device, where the configuration message is used to indicate the terminal device to establish the at least three RLC entities on the first bearer, and includes identifiers of the to-be-configured RLC entities or logical channel identifiers.

In an optional implementation, the first communications module 2601 is further configured to send a first instruction to the terminal device, where the first instruction includes a bearer status field, the bearer status field includes at least one bit, the bearer status field corresponds to a bearer configured with a duplicate transmission function, each bit in the bearer status field corresponds to one RLC entity on the bearer, and the bit is used to indicate to activate or deactivate a duplicate transmission function of the corresponding RLC entity.

In an optional implementation, the first instruction further includes a bearer indication field, the bearer indication field includes at least one bit, and each bit corresponds to one bearer configured with a duplicate transmission function, and is used to indicate whether the first instruction includes a bearer status field corresponding to the bearer.

In an optional implementation, the first communications module 2601 is further configured to receive a first indication sent by the terminal device, where the first indication is used to indicate a quantity of bits of an unsent duplicated data packet in an RLC entity that is of the terminal device and whose duplicate transmission function is activated.

In an optional implementation, the access network device is a master access network device, and further includes a second communications module, configured to receive a second indication sent by a secondary access network device, where the second indication is used to indicate a quantity of bits of an unsent duplicated data packet in an RLC entity that is of the secondary access network device and whose duplicate transmission function is activated.

In an optional implementation, the access network device is a master access network device. The first communications module 2601 is further configured to send a second instruction to the terminal device, where the second instruction is used to instruct the terminal device to perform data transmission with a second access network device. The access network device further includes a second communications module, configured to indicate the second access network device to perform data transmission with the terminal device through an RLC entity on the first bearer.

In an optional implementation, each RLC entity on the first bearer corresponds to one subband or one subband set, and at least two RLC entities of the one or more access network devices on the first bearer correspond to different subbands or different subband sets.

In an optional implementation, the first bearer includes at least two RLC entities of the master access network device and at least one RLC entity of the secondary access network device; or the first bearer includes at least two RLC entities of the secondary access network device and at least one RLC entity of the master access network device; or the first bearer includes at least three RLC entities of the master access network device; or the first bearer includes at least three RLC entities of the secondary access network device.

In an example, an embodiment of this application provides another access network device. The access network device may be the first access network device in the foregoing method embodiments, or may be one or more chips in the first access network device. The access network device may be configured to perform some or all functions of the first access network device in the foregoing method embodiments. The access network device may include a first communications module 2701 and a second communications module 2702.

The first communications module 2701 is configured to receive first indication information from a second access network device, where the first indication information is used to indicate an RLC entity, of a terminal device, that corresponds to the second access network device and whose duplicate transmission function needs to be activated or deactivated. The second communications module 2702 is configured to send, by the first access network device, a first instruction to the terminal device, where the first instruction includes a first information element, and the first information element is used to activate or deactivate the duplicate transmission function of the RLC entity that is of the terminal device and that is indicated by the second access network device.

Optionally, the first communications module 2701 is further configured to send second indication information to the second access network device, where the second indication information is used to indicate an RLC entity, of the terminal device, that corresponds to the access network device and whose duplicate transmission function needs to be activated or deactivated.

Optionally, the first instruction further includes a second information element, and the second information element is used to activate or deactivate the RLC entity that has the duplicate transmission function and that is used for communication between the access network device and the terminal device.

Figure 28:
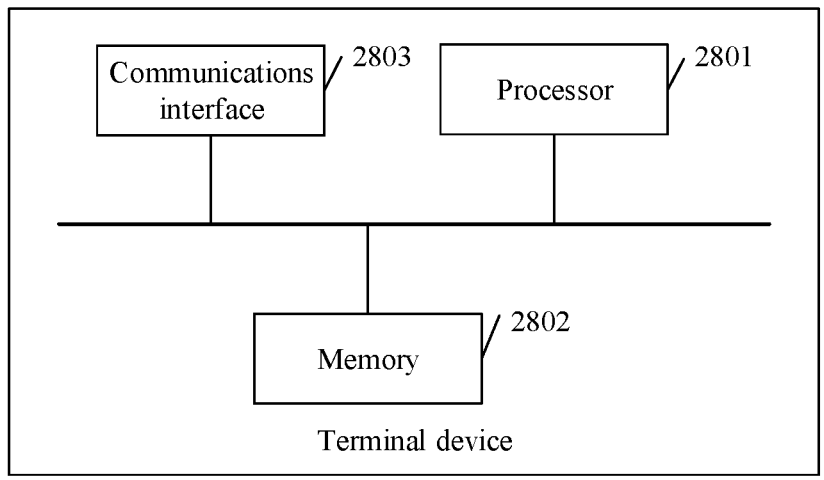
FIG. 28 is a schematic structural diagram of another terminal device according to an embodiment of this application.

FIG. 28 is a schematic structural diagram of a terminal device according to an embodiment of this application. The terminal device may perform behavior functions of the terminal device in the foregoing method embodiments. As shown in FIG. 28, the terminal device 2800 includes a processor 2801, a memory 2802, and a communications interface 2803. The processor 2801, the memory 2802, and the communications interface 2803 are connected to each other.

The processor 2801 may be a central processing unit (CPU), a general-purpose processor, a coprocessor, a digital signal processor (DSP), an application-specific integrated circuit (ASIC), a field programmable gate array (FPGA) or another programmable logic device, a transistor logic device, a hardware component, or any combination thereof. The processor 2801 may alternatively be a combination implementing a computing function, for example, a combination of one or more microprocessors or a combination of a DSP and a microprocessor.

The communications interface 2803 is configured to implement communication with another network element (for example, an access network device).

The processor 2801 invokes program code stored in the memory 2802, to perform the steps performed by the terminal device in the foregoing method embodiments.

Figure 29:
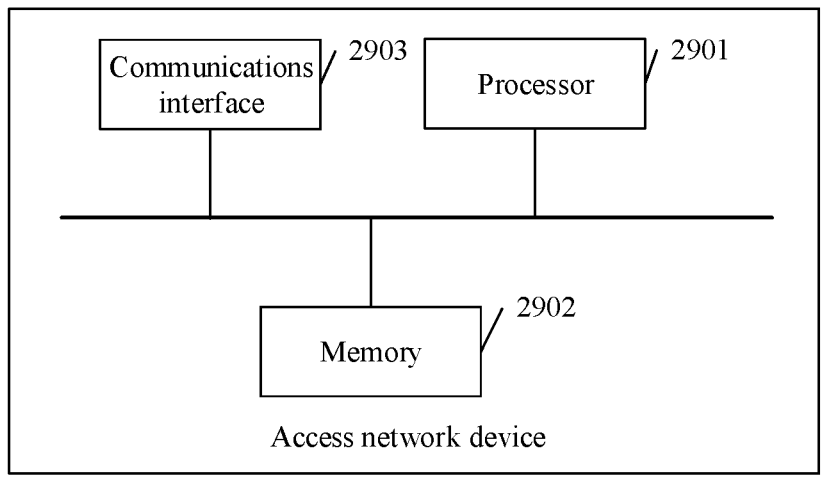
FIG. 29 is a schematic structural diagram of still another access network device according to an embodiment of this application.

FIG. 29 is a schematic structural diagram of an access network device according to an embodiment of this application. The access network device may perform behavior functions of any access network device in the foregoing method embodiments. As shown in FIG. 29, the access network device 2900 includes a processor 2901, a memory 2902, and a communications interface 2903. The processor 2901, the memory 2902, and the communications interface 2903 are connected to each other.

The processor 2901 may be a central processing unit (CPU), a general-purpose processor, a coprocessor, a digital signal processor (DSP), an application-specific integrated circuit (ASIC), a field programmable gate array (FPGA) or another programmable logic device, a transistor logic device, a hardware component, or any combination thereof. The processor 2901 may alternatively be a combination implementing a computing function, for example, a combination of one or more microprocessors or a combination of a DSP and a microprocessor.

The communications interface 2903 is configured to implement communication with another network element (for example, an access network device).

The processor 2901 invokes program code stored in the memory 2902, to perform the steps performed by the any access network device in the foregoing method embodiments.

It should be noted that, in the foregoing embodiments, the descriptions of each embodiment have respective focuses. For a part that is not described in detail in an embodiment, refer to related descriptions in other embodiments.

Steps in the methods in the embodiments of the present invention may be adjusted, combined, or deleted based on an actual requirement.

The modules in the terminal device and the access network device in the embodiments of the present invention may be combined, obtained through division, or deleted based on an actual requirement.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions set forth in the foregoing embodiments or make equivalent replacements to some or all technical features thereof, without departing from the scope of the technical solutions of the embodiments of this application.

What is claimed is:

1. A communication method, applied to a terminal device, the method comprising:
    receiving a configuration message, wherein the configuration message indicates the terminal device to establish at least three radio link control (RLC) entities on a first bearer;
    establishing the at least three RLC entities on the first bearer based on the configuration message;
    establishing, for each RLC entity, a media access control (MAC) entity; wherein each MAC entity established by the terminal device communicates with a corresponding MAC entity in a network device on a one-on-one correspondence; and
    performing data transmission through at least one RLC entity on the first bearer.

2. The method according to claim 1, wherein the performing the data transmission through the at least one RLC entity on the first bearer comprises:
    generating a first data packet; and
    performing duplicate transmission on the first data packet through at least two RLC entities on the first bearer.

3. The method according to claim 2, further comprising:
    indicating, to an RLC entity in the at least two RLC entities, that the first data packet is a duplicated data packet.

4. The method according to claim 1, further comprising:
    receiving a first instruction from an access network device, wherein the first instruction comprises a bearer status field, the bearer status field comprises at least one bit, the bearer status field corresponds to a bearer configured with a duplicate transmission function, each bit in the bearer status field corresponds to one secondary RLC entity on the bearer, and the bit is used to indicate to activate or deactivate a duplicate transmission function of the corresponding secondary RLC entity.

5. The method according to claim 1, wherein the performing the data transmission through the at least one RLC entity on the first bearer comprises:
performing the data transmission with a first access network device through the at least one RLC entity on the first bearer; and
wherein the method further comprises:
receiving a second instruction sent by a master access network device, wherein the second instruction instructs the terminal device to perform the data transmission with a second access network device;
resetting the RLC entities on the first bearer; and
performing the data transmission with the second access network device through the reset RLC entities.

6. The method according to claim 1, wherein each RLC entity on the first bearer corresponds to one subband or one subband set, and at least two RLC entities of the terminal device on the first bearer correspond to different subbands or different subband sets.

7. The method according to claim 1, wherein the configuration message further includes a third indication, wherein the third indication indicates initial activation states of duplicate transmission functions of the at least three RLC entities.

8. The method according to claim 4, wherein the at least one bit in the bearer status field are sorted in ascending order of values of logical channel identifiers of corresponding RLC entities, or are sorted in descending order of values of logical channel identifiers of corresponding RLC entities.

9. A terminal device comprising:
a processor; and
a memory coupled to the processor and having processor-executable instructions stored thereon, which when executed by the processor cause the terminal device to implement operations including:
receiving a configuration message, wherein the configuration message indicates the terminal device to establish at least three radio link control (RLC) entities on a first bearer; and
establishing the at least three RLC entities on the first bearer based on the configuration message;
establishing, for each RLC entity, a media access control (MAC) entity; wherein each MAC entity established by the terminal device communicates with a corresponding MAC entity in a network device on a one-on-one correspondence; and
performing data transmission through at least one RLC entity on the first bearer.

10. The terminal device according to claim 9, wherein the operations further comprise:
generating a first data packet; and
performing duplicate transmission on the first data packet through at least two RLC entities on the first bearer.

11. The terminal device according to claim 10, wherein the operations further comprise:
indicating, to an RLC entity in the at least two RLC entities, that the first data packet is a duplicated data packet.

12. The terminal device according to claim 9, wherein the operations further comprise:
receiving a first instruction from an access network device, wherein the first instruction comprises a bearer status field, the bearer status field comprises at least one bit, the bearer status field corresponds to a bearer configured with a duplicate transmission function, each bit in the bearer status field corresponds to one secondary RLC entity on the bearer, and the bit is used to indicate to activate or deactivate a duplicate transmission function of the corresponding secondary RLC entity.

13. The terminal device according to claim 9, wherein the configuration message further includes a third indication, wherein the third indication indicates initial activation states of duplicate transmission functions of the at least three RLC entities.

14. The terminal device according to claim 12, wherein the at least one bit in the bearer status field are sorted in ascending order of values of logical channel identifiers of corresponding RLC entities, or are sorted in descending order of values of logical channel identifiers of corresponding RLC entities.

15. A non-transitory computer-readable storage medium, storing processor-executable instructions that, when executed by a processor, cause the processor to implement at least the following operations:
receiving a configuration message, wherein the configuration message indicates the terminal device to establish at least three radio link control RLC entities on a first bearer;
establishing the at least three RLC entities on the first bearer based on the configuration message;
establishing, for each RLC entity, a media access control (MAC) entity; wherein each MAC entity established by the terminal device communicates with a corresponding MAC entity in a network device on a one-on-one correspondence; and
performing data transmission through at least one RLC entity on the first bearer.

16. The non-transitory computer-readable storage medium according to claim 15, wherein the operations further comprise:
generating a first data packet; and
performing duplicate transmission on the first data packet through at least two RLC entities on the first bearer.

17. The non-transitory computer-readable storage medium according to claim 16, wherein the operations further comprise:
indicating, to an RLC entity in the at least two RLC entities, that the first data packet is a duplicated data packet.

18. The non-transitory computer-readable storage medium according to claim 15, wherein the operations further comprise:
receiving a first instruction from an access network device, wherein the first instruction comprises a bearer status field, the bearer status field comprises at least one bit, the bearer status field corresponds to a bearer configured with a duplicate transmission function, each bit in the bearer status field corresponds to one secondary RLC entity on the bearer, and the bit is used to indicate to activate or deactivate a duplicate transmission function of the corresponding secondary RLC entity.

19. The non-transitory computer-readable storage medium according to claim 15, wherein the configuration message further includes a third indication, wherein the third indication indicates initial activation states of duplicate transmission functions of the at least three RLC entities.

20. The non-transitory computer-readable storage medium according to claim 18, wherein the at least one bit in the bearer status field are sorted in ascending order of values of logical channel identifiers of corresponding RLC entities, or are sorted in descending order of values of logical channel identifiers of corresponding RLC entities.

* * * * *